United States Patent
Hofström et al.

(10) Patent No.: US 12,010,623 B2
(45) Date of Patent: Jun. 11, 2024

(54) DISCONTINUOUS RECEPTION IN A WIRELESS COMMUNICATION SYSTEM

(71) Applicant: Telefonaktiebolaget LM Ericsson (publ), Stockholm (SE)

(72) Inventors: Björn Hofström, Linköping (SE); Helka-Liina Määttänen, Helsinki (FI)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 322 days.

(21) Appl. No.: 17/293,612

(22) PCT Filed: Nov. 12, 2019

(86) PCT No.: PCT/SE2019/051143
§ 371 (c)(1),
(2) Date: May 13, 2021

(87) PCT Pub. No.: WO2020/101558
PCT Pub. Date: May 22, 2020

(65) Prior Publication Data
US 2022/0022136 A1    Jan. 20, 2022

Related U.S. Application Data

(60) Provisional application No. 62/760,906, filed on Nov. 13, 2018.

(51) Int. Cl.
*H04W 52/02*    (2009.01)
*H04L 1/1812*    (2023.01)
*H04W 76/28*    (2018.01)

(52) U.S. Cl.
CPC ....... *H04W 52/0232* (2013.01); *H04L 1/1812* (2013.01); *H04W 76/28* (2018.02)

(58) Field of Classification Search
CPC .. H04W 52/0232; H04W 76/28; H04L 1/1812
USPC ................. 370/311, 328, 329, 341, 345, 350
See application file for complete search history.

(56) References Cited

FOREIGN PATENT DOCUMENTS

| | | |
|---|---|---|
| JP | 2016505233 A | 2/2016 |
| WO | 2014175003 A1 | 10/2014 |
| WO | 2017080615 A1 | 5/2017 |
| WO | 2020065530 A1 | 4/2020 |

OTHER PUBLICATIONS

IDS (filed May 13, 2021), Cite No. 3, 3GPP TS 38.321 v15.3.0 (Sep. 2018), 1-76.*
Ericsson, "On DRX for NTN", 3GPP TSG-RAN WG2 #104, Tdoc R2-1817750, Spokane, US, Nov. 12-16, 2018, 1-5.
(Continued)

*Primary Examiner* — Nghi H Ly
(74) *Attorney, Agent, or Firm* — Weisberg I.P. Law, P.A.

(57) ABSTRACT

A wireless device (14) is configured for use in a wireless communication system (10). The wireless device (14) configures a number of parallel hybrid automatic repeat request, HARQ, processes (18) as being available for use. The wireless device (14) discontinuously monitors a downlink control channel (20), including monitoring the downlink control channel (20) during an active time (24) that is based on how many of the configured number of parallel HARQ processes (18) are used.

24 Claims, 23 Drawing Sheets

(56) References Cited

OTHER PUBLICATIONS

3GPP, "3GPP TS 38.321 V15.4.0", 3rd Generation Partnership Project; Technical Specification Group Radio Access Network; NR; Medium Access Control (MAC) protocol specification (Release 15), Dec. 2018, 1-77.

3GPP, "3GPP TR 38.811 V15.0.0", 3rd Generation Partnership Project; Technical Specification Group Radio Access Network; Study on New Radio (NR) to support non terrestrial networks (Release 15), Jun. 2018, 1-118.

3GPP, "3rd Generation Partnership Project; Technical Specification Group Radio Access Network; NR; Medium Access Control (MAC) protocol specification (Release 15) 3GPP TS 38.321 V15.3.0", 3GPP TS 38.321 V15.3.0, Sep. 2018, 1-76.

3GPP, "3rd Generation Partnership Project; Technical Specification Group Radio Access Network; NR; Physical layer procedures for data (Release 15)", 3GPP TS 38.214 V15.2.0, Jun. 2018, 1-94.

3GPP, "3rd Generation Partnership Project; Technical Specification Group Radio Access Network; Solutions for NR to support non-terrestrial networks (NTN) (Release 16)", 3GPP TR 38.821 V0.2.0, Oct. 2018, 1-27.

Huawei, et al., "Discussion on HARQ for NTN", 3GPP TSG RAN WG1 Meeting #98, R1-1908050, Prague, Czech Republic, Aug. 26-30, 2019, 1-5.

Interdigital Inc., "Deactivating HARQ for Non-Terrestrial Networks", 3GPP TSG RAN WG1 Meeting #92bis, R1-1804857, Sanya, China, Apr. 16-20, 2018, 1-3.

Nokia, et al., "On the number of HARQ processes", 3GPP TSG-RAN WG1#89, R1-1708529, Hangzhou, P.R. China, May 15-19, 2017, 1-3.

Nomor Research Gmbh, et al., "Considerations on MAC Control Loops and Timings in Non-Terrestrial Networks (NTN)", 3GPP TSG-RAN WG2 Meeting # 103-Bis, R2-1813615, Chengdu, China, Oct. 8-12, 2018, 1-6.

Thales, et al., "NR-NTN: TP for Chap 7.3 NR modifications to support NTN", 3GPP TSG RAN Meeting #80, RP-181394, (revision from RP-181380), La Jolla, USA, Jun. 11-Jun. 14, 2018, 1-37.

Ericsson, "On adapting HARQ procedures for NTN", 3GPP TSG-RAN WG1 Meeting #94bis, Tdoc R1-1811330, Chengdu, China, Oct. 8-12, 2018, 1-3.

Thales, et al., "Study on NR to support Non-Terrestrial Networks", 3GPP TSG RAN WG1 Meeting 88bis, RP-171450. West Palm Beach, USA, Jun. 5-9, 2017, 1-5.

Thales, "Study on solutions evaluation for NR to support Non Terrestrial Network", 3GPP TSG RAN meeting #80, RP-181370, La Jolla, USA, Jun. 11-14, 2018, 1-5.

Ericsson, et al., "DRX adaptions for NTN", 3GPP TSG-RAN WG2 #108, Tdoc R2-1915566, Reno, Nevada, US, Nov. 18-22, 2019, 1-11.

* cited by examiner

DISCONTINUOUS RECEPTION IN A WIRELESS COMMUNICATION SYSTEM

TECHNICAL FIELD

The present application relates generally to a wireless communication system, and relates more particularly to discontinuous reception in such a wireless communication system.

BACKGROUND

A wireless device receives control messages over a downlink control channel, e.g., a Physical Downlink Control Channel, PDCCH. The control messages may for instance include scheduling information for scheduling an uplink or downlink transmission. Continuously monitoring the downlink control channel all the time, though, would consume significant energy and shorten battery life. To mitigate this, the wireless device can be configured with discontinuous reception (DRX). In DRX, the wireless device discontinuously monitors the downlink control channel. In particular, the wireless device monitors the downlink control channel during a so-called active time. Outside of the active time, the wireless device does not monitor the downlink control channel and may instead operate in a sleep state that conserves energy, e.g., by turning off one or more power-consuming components of the wireless device such as one or more receivers.

The active time in DRX includes an on-duration that periodically recurs at a certain interval. If the wireless device receives a control message on the downlink control channel within the on-duration, though, the wireless device may continue monitoring the downlink control channel for a little while longer even beyond the on-duration. The wireless device effectively extends the active time in this way in order to make sure that activity on the downlink control channel for the wireless device ceases before the wireless device stops monitoring that downlink control channel.

While existing DRX approaches meaningfully improve power conservation and battery life of a wireless device, it remains desirable to further optimize device power conservation and battery life.

SUMMARY

Some embodiments herein exploit certain circumstances attributable to hybrid automatic repeat request (HARQ) operation as opportunities for a wireless device to stop monitoring a downlink control channel. For example, some embodiments capitalize on the occurrence of HARQ stalling at the wireless device, where the wireless device has used all configured parallel HARQ processes, as an opportunity for the wireless device to stop monitoring the downlink control channel. If for instance the wireless device receives a control message on the downlink control channel within the on-duration of DRX, the wireless device may or may not continue monitoring the downlink control channel beyond the on-duration, depending on whether HARQ stalling has occurred. Indeed, if HARQ stalling has occurred, the wireless device can safely stop monitoring the downlink control channel, since HARQ stalling means no more activity will occur for the wireless device on the downlink control channel until HARQ stalling resolves. Some embodiments therefore generally base the active time of DRX operation on how many of a configured number of parallel HARQ processes are used. These and other embodiments may thereby advantageously improve power conservation and battery life of a wireless device.

More particularly, embodiments herein include a method performed by a wireless device configured for use in a wireless communication system. The method comprises configuring a number of parallel hybrid automatic repeat request, HARQ, processes as being available for use. The method also comprises discontinuously monitoring a downlink control channel, including monitoring the downlink control channel during an active time that is based on how many of the configured number of parallel HARQ processes are used.

In some embodiments, the active time includes times while one or more timers are running, e.g., including a DRX inactivity timer. No matter the particular timer(s), though, the method in this case may further comprise controlling at least one of the one or more timers based on how many of the configured number of parallel HARQ processes are being used. For example, in some embodiments, such control comprises stopping, or refraining from starting, the at least one of the one or more timers, responsive to a last available one of the configured number of parallel HARQ processes being put into use. Alternatively or additionally, such control may comprise, responsive to a last available one of the configured number of parallel HARQ processes being put into use, starting a HARQ stall timer. In this case, control may further entail, while the HARQ stall timer is running, controlling the at least one of the one or more timers to not be running. In one embodiment, then, responsive to expiration of the HARQ stall timer, the at least one of the one or more timers may be started or re-started.

Regardless, the method in some embodiments may generally further comprise, responsive to a last available one of the configured number of parallel HARQ processes being put into use, starting a HARQ stall timer. The method in this case may also comprise monitoring the downlink control channel responsive to expiration of the HARQ stall timer.

In some embodiments that exploit a HARQ stall timer, the HARQ stall timer may be started with a value that is a function of: (i) a time elapsed between when a first available one of the configured number of parallel HARQ processes was put into use and when the last available one of the configured number of parallel HARQ processes is put into use; and (ii) a round-trip time or round-trip delay in the wireless communication system.

In some embodiments, the active time is based on whether all of the configured number of parallel HARQ processes are used.

In some embodiments, the number of parallel HARQ processes comprises the number of parallel HARQ processes available for use in a certain communication direction.

In some embodiments, the wireless communication system is a non-terrestrial wireless communication system.

Embodiments herein also include a method performed by a network node configured for use in a wireless communication system. The method comprises transmitting, to a wireless device, control signaling that configures the wireless device to discontinuously monitor a downlink control channel by monitoring the downlink control channel during an active time that is based on how many of a number of configured parallel HARQ processes are used.

In some embodiments, the active time includes times while one or more timers at the wireless device are running, e.g., including a DRX inactivity timer. No matter the particular timer(s), though, the control signaling may configure the wireless device to control at least one of the one or more timers based on how many of the configured number of parallel HARQ processes are being used. In some embodiments, for instance, the control signaling configures the wireless device to stop, or refrain from starting, the at least one of the one or more timers, responsive to a last available one of the configured number of parallel HARQ processes being put into use.

In some embodiments, the control signaling configures the wireless device to: (i) responsive to a last available one of the configured number of parallel HARQ processes being put into use, start a HARQ stall timer; (ii) while the HARQ stall timer is running, control the at least one of the one or more timers to not be running; and (iii) responsive to expiration of the HARQ stall timer, start or re-start the at least one of the one or more timers.

Alternatively or additionally, in some embodiments, the control signaling configures the wireless device to: (i) responsive to a last available one of the configured number of parallel HARQ processes being put into use, start a HARQ stall timer; and (ii) monitor the downlink control channel responsive to expiration of the HARQ stall timer.

In some embodiments that exploit a HARQ stall timer, the control signaling may configure a value of the HARQ stall timer that is a function of: (i) a time elapsed between when a first available one of the configured number of parallel HARQ processes was put into use and when the last available one of the configured number of parallel HARQ processes is put into use; and (ii) a round-trip time or round-trip delay in the wireless communication system.

In some embodiments, the active time is based on whether all of the configured number of parallel HARQ processes are used.

In some embodiments, the number of parallel HARQ processes comprises the number of parallel HARQ processes available for use in a certain communication direction.

In some embodiments, the wireless communication system is a non-terrestrial wireless communication system.

Embodiments herein also include corresponding apparatus, computer programs, and carriers such as non-transitory computer-readable mediums. For example, embodiments herein further include a wireless device configured for use in a wireless communication system. The wireless device is configured (e.g., via communication circuitry and processing circuitry) to configure a number of parallel hybrid automatic repeat request, HARQ, processes as being available for use. The wireless device is also configured to discontinuously monitor a downlink control channel, including monitoring the downlink control channel during an active time that is based on how many of the configured number of parallel HARQ processes are used.

Embodiments herein also include a network node configured for use in a wireless communication system. The network node is configured (e.g., via communication circuitry and processing circuitry) to transmit, to a wireless device, control signaling that configures the wireless device to discontinuously monitor a downlink control channel by monitoring the downlink control channel during an active time that is based on how many of a number of configured parallel HARQ processes are used.

DETAILED DESCRIPTION

Figure 1:
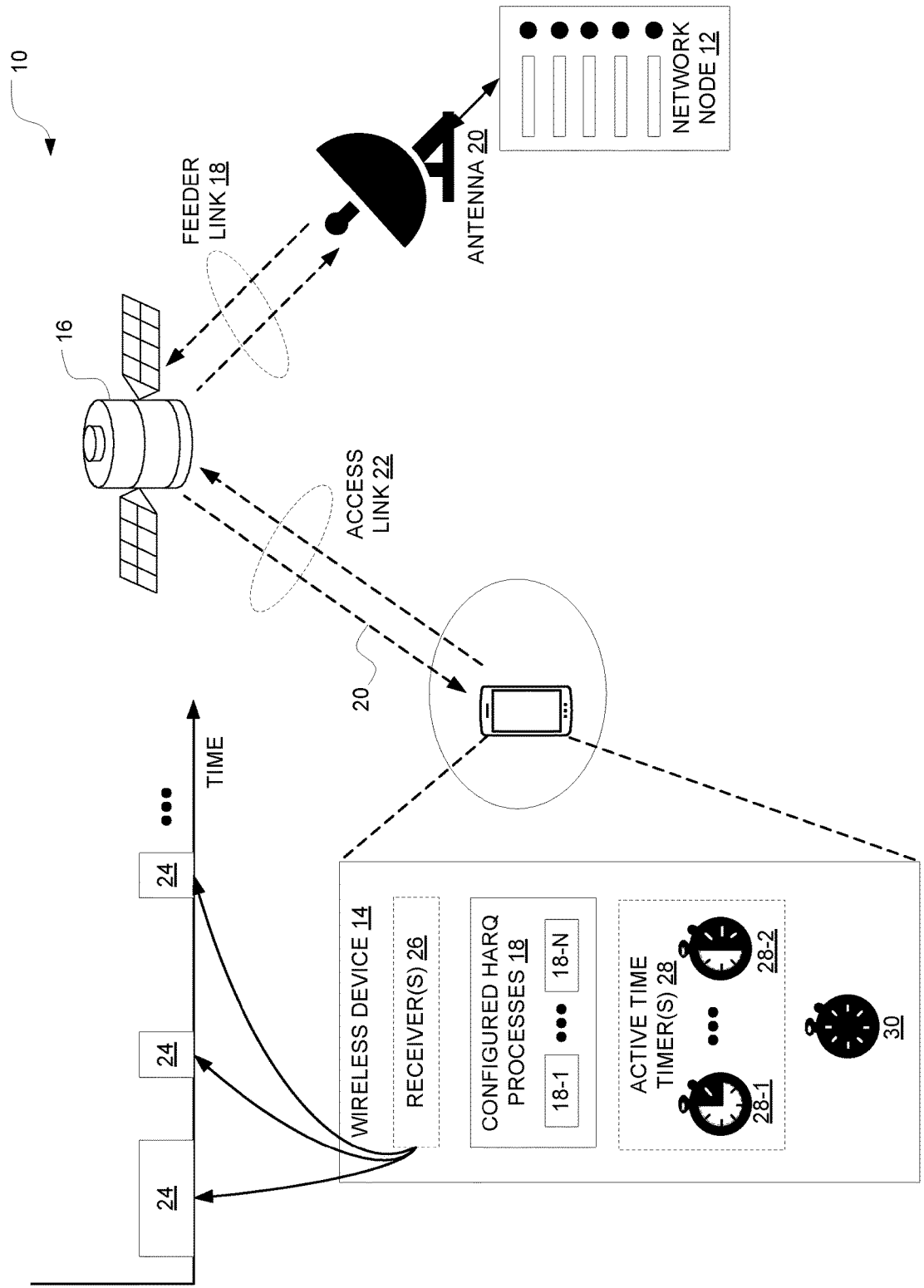
FIG. 1 is a block diagram of a wireless communication system according to some embodiments.

FIG. 1 shows a wireless communication system 10 according to some embodiments. The wireless communication system 10 may for instance be a non-terrestrial wireless communication system, which may use a satellite-based radio access network. In this case, as shown, the wireless communication system 10 may include a network node 12 (e.g., a base station) that communicates with a wireless device 14 via a satellite 16. More particularly, the network node 12 may connect to the satellite 16 over a feeder link 18 via an antenna 20, and the satellite 16 may in turn connect to the wireless device 14 via an access link 22. Regardless, communication in a direction from the network node 12 towards the wireless device 14 is referred to as a downlink direction, whereas communication in a direction from the wireless device 14 towards the network node 12 is referred to as an uplink direction.

No matter the particular type of the wireless communication system 10, the wireless device 14 is configured for hybrid automatic repeat request (HARQ). The wireless device 14 in this regard is configured with a number N of parallel HARQ processes 18 that are available for use, e.g., in a certain communication direction such as the downlink direction or the uplink direction. These N parallel HARQ processes 18 are shown in FIG. 1 as HARQ processes 18-1 . . . 18-N with N>1.

In embodiments where the HARQ processes 18 are available for use in the uplink direction, for example, each HARQ process 18-1 . . . 18-N governs a separate stop and wait process for acknowledgement feedback that acknowledges uplink transmissions from the wireless device 14. More specifically, the network node 12 according to some embodiments transmits a control message on a downlink control channel 20, e.g., a Physical Downlink Control Channel (PDCCH). The control message schedules an uplink transmission for the wireless device 14 and indicates which of the HARQ processes 18 to use for that uplink transmission. After the wireless device 14 performs the scheduled uplink transmission, the wireless device 14 must stop and wait for the network node 12 to return acknowledgement feedback before a new transmission or a re-transmission can be scheduled or performed using the same HARQ process.

Similarly, in embodiments where the HARQ processes 18 are available for use in the downlink direction, each HARQ process 18-1 . . . 18-N governs a separate stop and wait process for acknowledgement feedback that acknowledges downlink transmissions to the wireless device 14. More specifically, the network node 12 according to some embodiments transmits, on the downlink control channel 20, a control message that schedules a downlink transmission for the wireless device 14 and indicates which of the HARQ processes 18 to use for that downlink transmission. After the network node 12 performs the scheduled downlink transmission, the network node 12 must stop and wait for the wireless device 14 to return acknowledgement feedback before a new transmission or a re-transmission can be scheduled or performed using the same HARQ process.

The stop and wait nature of each individual HARQ process introduces inherent latency. To mitigate this latency, though, multiple ones of the HARQ processes 18 may be used in parallel, i.e., independently of one another. This way, while one HARQ process is waiting for acknowledgement feedback, another HARQ process can perform a transmission, e.g., up to 16 new data transmissions in New Radio (NR) may be initiated without waiting for acknowledgement feedback for the first transmission.

So-called HARQ stalling nonetheless occurs when all of the configured HARQ processes are used. With no HARQ process available to use, HARQ stalling means that no new transmission or re-transmission can be scheduled or performed, at least until HARQ stalling is resolved by acknowledgement feedback being returned for one of the used HARQ processes.

Some embodiments herein actually capitalize on the occurrence of HARQ stalling at the wireless device 14 as an opportunity for the wireless device 14 to stop monitoring the downlink control channel 20. Indeed, if HARQ stalling has occurred, the wireless device 14 can safely stop monitoring the downlink control channel 20, since HARQ stalling means no more activity will occur for the wireless device 14 on the downlink control channel 20 until HARQ stalling resolves. For example, since HARQ stalling means no new transmission or re-transmission can be scheduled or performed until HARQ stalling resolves, the wireless device 14 need not monitor the downlink control channel 20 for a control message scheduling such a transmission or re-transmission until HARQ stalling resolves. These and other embodiments may thereby advantageously improve power conservation and battery life of the wireless device 14.

The wireless device 14 in this regard is configured to discontinuously monitor the downlink control channel 20, e.g., in discontinuous reception (DRX) operation. The wireless device 14 does so by monitoring the downlink control channel 20 during so-called active time 24. Active time 24 includes any time that the wireless device 14 monitors the downlink control channel 20. Monitoring the downlink control channel 20 may for instance involve using one or more receivers 26 at the wireless device 14 to attempt to detect a control message on the downlink control channel 20 and process the control message to determine whether the control message was intended for the wireless device 14. Outside of the active time 24, the wireless device 14 does not monitor the downlink control channel 20 and may instead operate in a sleep state that conserves energy, e.g., by turning off one or more power-consuming components of the wireless device 14 such as the one or more receivers 26.

According to some embodiments herein, the active time 24 is based on how many of the configured number N of parallel HARQ processes 18 are used. That is, the wireless device 14 monitors the downlink control channel 20 during an active time 24 that is based on (e.g., a function of or otherwise dependent on) how many of the configured number N of parallel HARQ processes 18 are used. In some embodiments, for example, the active time 24 is based on whether all of the configured number N of parallel HARQ processes 18 are used, i.e., whether HARQ stalling has occurred. In these and other embodiments, the wireless device 14 may exploit times when all of the configured number N of parallel HARQ processes 18 are used as an opportunity to exit active time 24 (or stay out of active time 24).

Figure 2:
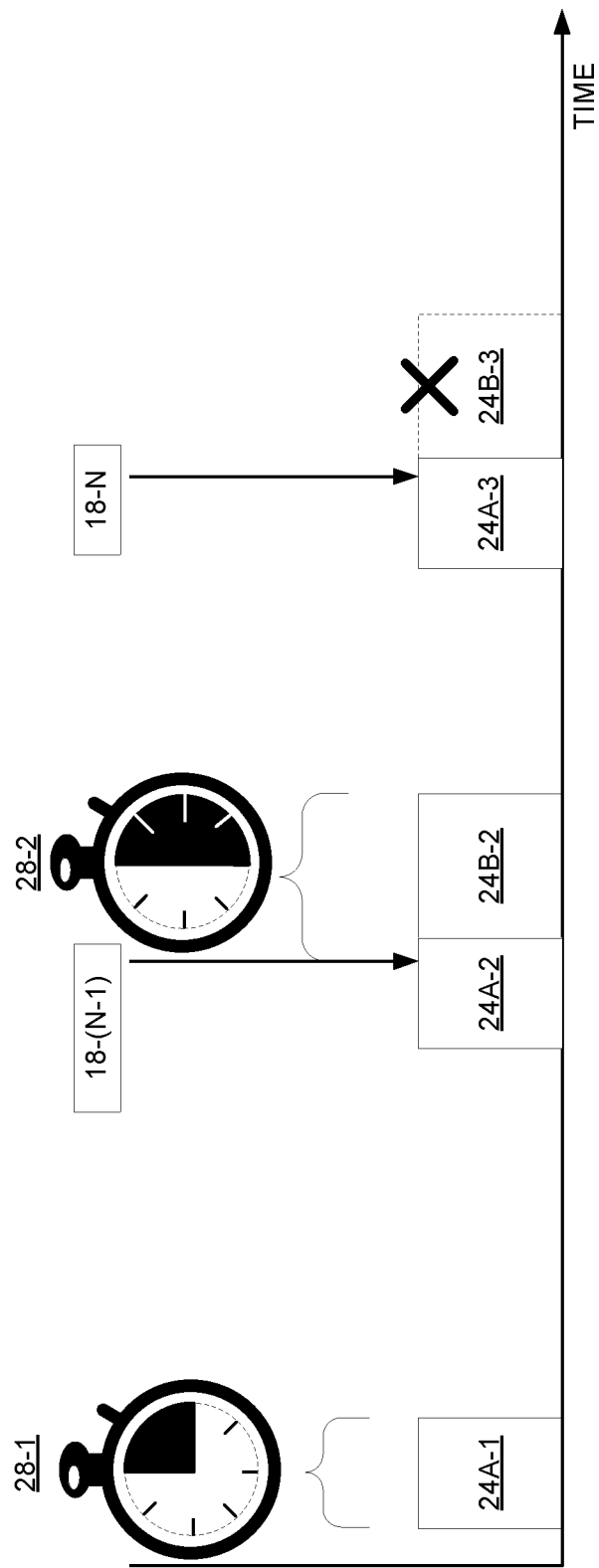
FIG. 2 is a timing diagram of discontinuous reception (DRX) operation according to some embodiments.

In some embodiments, the active time 24 more particularly includes times while one or more timers 28 are running. As one example, FIG. 1 shows that the active time 24 includes times while any of timers 28-1 and 28-2 are running. That is, at any given time, if either timer 28-1 or timer 28-2 is running, the wireless device 14 is monitoring the downlink control channel 20 in active time 24. In these and other embodiments, then, the wireless device 14 according to some embodiments may control at least one of the one or more timers 28 based on how many of the configured number N of parallel HARQ processes 18 are being used. For example, the wireless device 14 may control at least one of the one or more timers 28 to not be running (e.g., by stopping or starting that at least one timer) when or while all of the configured number N of parallel HARQ processes 18 are being used. FIG. 2 illustrates one example.

In the example of FIG. 2, timer 28-1 is a so-called on-duration timer that is periodically started with a certain duration. The duration during which the on-duration timer 28-1 is running is referred to as the onDuration. During the onDuration, the wireless device 14 monitors the downlink control channel 20. The onDuration therefore is one part or component of the active time 24 during which the wireless device 14 monitors the downlink control channel 20. As shown in FIG. 2, the onDuration periodically recurs as onDurations 24A-1, 24A-2, and 24-A3.

Also in the example of FIG. 2, timer 28-2 is a so-called DRX inactivity timer. While the DRX inactivity timer 28-2 is running, the wireless device 14 monitors the downlink control channel 20. Generally, except as indicated hereinafter, the DRX inactivity timer 28-2 is started or re-started when the wireless device 14 receives a control message on the downlink control channel 20. As shown in FIG. 2, then, the wireless device 14 does not receive a control message on the downlink control channel 20 during onDuration 24A-1. The wireless device 14 accordingly does not start the DRX inactivity timer 28-2, meaning that the active time 24 ends with the end of the onDuration 24A-1. However, during the next onDuration 24A-2, the wireless device 14 does receive a control message on the downlink control channel 20. The wireless device 14 accordingly starts the DRX inactivity timer 28-2. That DRX inactivity timer 28-2 runs during the interval 24B-2 shown in FIG. 2. While the DRX inactivity timer 28-2 runs during that interval 24B-2, the wireless device 14 continues to monitor the downlink control channel 20 even though the interval 24B-2 extends past the onDuration 24A-2. The DRX inactivity timer 28-2 may therefore extend the active time 24 beyond the onDuration if the wireless device 14 receives a control message during the onDuration and the DRX inactivity timer 28-2 continues to run even after the end of the onDuration. Expiry of the DRX inactivity timer 28-2 however means that the wireless device 14 has not received a control message on the downlink control channel 20 for some time, i.e., the downlink control channel 20 is inactive. When the DRX inactivity timer 28-2 expires, then, the wireless device 14 stops monitoring the downlink control channel 20, i.e., exits active time 24.

According to some embodiments, though, whether the wireless device 14 starts (or re-starts) the DRX inactivity timer 28-2 upon reception of a control message depends on how many of the configured number N of parallel HARQ processes 18 are used, e.g., taking into account the control message. As shown in FIG. 2, for example, the control message received during the onDuration 24A-2 puts into use the second-to-last available HARQ process 18-(N−1). Since not all of the configured number N of parallel HARQ processes 18 are put into use, even accounting for the received control message, the wireless device 14 starts (or re-starts) the DRX inactivity timer 28-2 so as to monitor the downlink control channel 20 during the interval 24B-2. However, during the next onDuration period 24A-3, the wireless device 14 receives a control message that puts into use the last available HARQ process 18-N. Responsive to this last available one of the configured number N of parallel HARQ processes being put into use, the wireless device 14 refrains from starting the DRX inactivity timer 28-2, or stops the DRX inactivity timer 28-2 if it is already running. Accordingly, even though the wireless device 14 received a control message during the onDuration period 24A-3, just like in the onDuration period 24A-2, there is no similar interval 24B-3 following the onDuration period 24A-3 during which the DRX inactivity timer 28-2 is running. Absent other triggers for monitoring the downlink control channel 20, then, the wireless device 14 stops monitoring the downlink control channel 20 at the end of the onDuration period 24A-3 (or in other embodiments may even stop before the end of the onDuration period 24A-3). Indeed, since the last available HARQ process has been put into use, i.e., HARQ stalling has occurred, the wireless device 14 can safely refrain from monitoring the downlink control channel 20 since no further control message is expected due to HARQ stalling.

Some embodiments may thereby improve power conservation and battery life of the wireless device 14. Some embodiments may prove particularly advantageous in these and other ways in a wireless communication system 10 with relatively long propagation delay or roundtrip time (RTT). This may include for instance non-terrestrial communication networks such as satellite-based networks. Indeed, with long propagation delay or roundtrip time, the system 10 proves more prone to HARQ stalling. This is because practical limitations on processing complexity at the wireless device 14 limit the number of HARQ processes that can be configured and/or used in parallel, while long RTT delays acknowledgement feedback and lengthens the time that each HARQ process will remain used.

Figure 3:
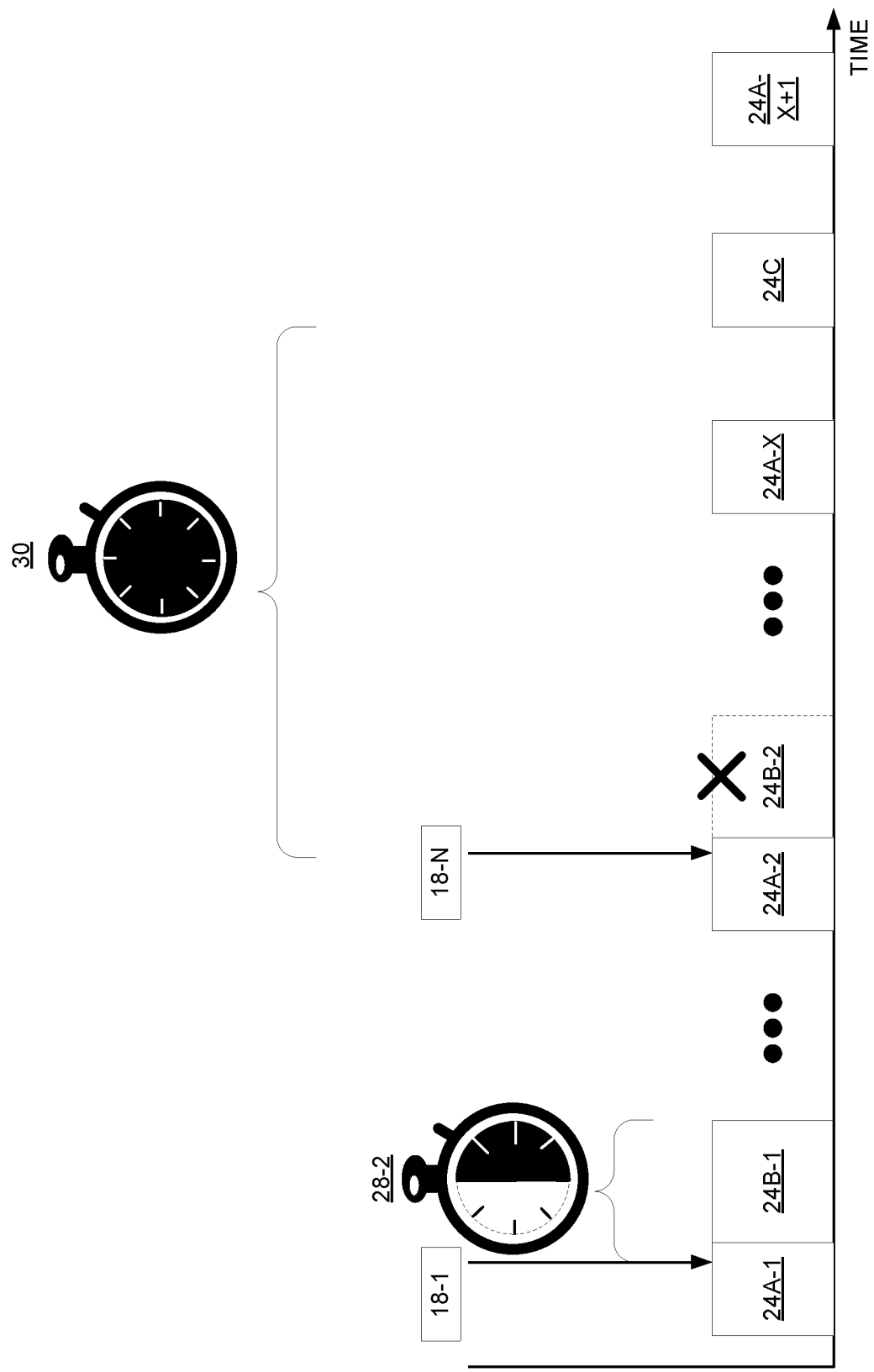
FIG. 3 is a timing diagram of discontinuous reception (DRX) operation according to other embodiments.

In any event, the wireless device 14 in some embodiments is configured to resume monitoring the downlink control channel 20 when HARQ stalling is expected to resolve. The type of HARQ stalling resolution may depend for instance on the round-trip time or round-trip delay in the wireless communication system 10. FIG. 3 shows one example.

As shown in FIG. 3, the wireless device 14 receives a control message in onDuration period 24A-2 that puts into use the last available HARQ process 18-N. The wireless device 14 accordingly refrains from starting (or stops) the DRX inactivity timer 28-2. In addition, the wireless device 14 starts a so-called HARQ stall timer 30. That is, responsive to the last available one of the HARQ processes 18 being put into use, the wireless device 14 starts the HARQ stall timer 30. Responsive to the HARQ stall timer 30 expiring, the wireless device 14 resumes monitoring the downlink control channel 20, e.g., by starting or restarting the DRX inactivity timer 28-2 or some other timer. The wireless device 14 may do so irrespective of the onDuration timer 28-1. As shown in FIG. 3, for instance, the HARQ stall timer 30 expires at a time between onDuration periods 24A-X and 24A-X+1. Despite this, the wireless device 14 nonetheless monitors the downlink control channel 20 during an interval 24C after the HARQ stall timer 30 expires. Accordingly, In some embodiments, the HARQ stall timer 30 is set to expire when HARQ stalling is expected to resolve. The HARQ stall timer 30 in these and other embodiments may be started with a value that is a function of a round-trip time or round-trip delay in the wireless communication system. Alternatively or additionally, the HARQ stall timer 30 may be started with a value that is a function of a time elapsed between when a first available one of the configured number of parallel HARQ processes 18 was put into use and when the last available one of the configured number of parallel HARQ processes 18 is put into use. In this case, for example, the HARQ stall timer 30 may be started with the value RTD—timeElapsed, where RTD is the round-trip time in the system 10 and timeElapsed is the time elapsed between when a first available one of the configured number of parallel HARQ processes 18 was put into use and when the last available one of the configured number of parallel HARQ processes 18 is put into use. Effectively, the HARQ stall timer 30 in this case should expire when acknowledgement feedback for the first-used HARQ process is received, thereby resolving HARQ stalling.

Note that, in some embodiments, the wireless device 14 is configured to receive control signaling from a network node (e.g., network node 12) that configures the wireless device 14 to operate as described above. The control signaling may for instance indicate whether or not the wireless device 14 is to operate as described above, and/or may indicate one or more parameters that govern how the wireless device 14 is to operate as described above. Such parameter(s) may for example include a value of one more timers or thresholds used in the above operation.

Generally, then, some embodiments herein control DRX operation of a wireless device 14 based on or otherwise accounting for HARQ stalling, e.g., whereby HARQ processing stalls due to all configured parallel HARQ processes 18 being in use. Some embodiments for instance control DRX active time 24 (during which the wireless device 14 monitors a downlink control channel 20, e.g., PDCCH) to exclude a time interval during which HARQ stalls. This time interval may include for instance an interval of time occurring (immediately) after the wireless detects 14 it has used or allocated all HARQ processes 18 with which the wireless device 14 is configured. This may correspond to a time interval occurring (immediately) after the wireless device 14 uses or allocates the last HARQ process with which it is configured (e.g., see Example of Embodiment E1 below). The time interval may end, though, when the wireless device 14 expects another transmission or reception, e.g., as dependent on the propagation delay, roundtrip time, or roundtrip delay of the wireless communication system 10. Moreover, in some embodiments, the wireless device 14 conditionally excludes this time interval from its DRX active time 24, only if the time interval is long enough to justify doing so, e.g., if the time interval is long enough to justify transitioning to a sleep state during the time interval. This condition may be controlled by a threshold signalled from the network to the wireless device 14, e.g., such that the wireless device 14 excludes the time interval from its DRX active time 24 if the time interval is greater than (or equal to) the threshold. The threshold may be signalled via RRC, DCI, system information, or the like.

In some embodiments, the wireless device 14 excludes the time interval from its DRX active time 24 by controlling when one or more timers run. For example, in one or more embodiments, the active time 24 includes times when one or more timers 28 are running, e.g., including a DRX inactivity timer. In this case, the wireless device 14 may control at least one of the one or more timers (e.g., the DRX inactivity timer) based on how many of the configured number of parallel HARQ processes 18 are being used, e.g., based on whether all of the configured number of parallel HARQ processes 18 are being used. For instance, after the last available of the configured number of parallel HARQ processes 18 is put into use, the wireless device 14 may control the at least one of the one or more timers 28 (e.g., the DRX inactivity timer) to not be running for a time interval (e.g., the time interval described above). The wireless device 14 may for example stop (or refrain from starting) the at least one timer.

One or more embodiments may control the active time 24 in these and other ways through use of a certain timer, e.g., referred to for convenience as a HARQ stall timer. For example, in some embodiments, responsive to a last available one of the configured number of parallel HARQ processes 18 being put into use, the wireless device 14 starts a HARQ stall timer with a value corresponding to the time interval, e.g., if the time interval is greater than a threshold. While the HARQ stall timer is running, the wireless device 14 controls the at least one of the one or more timers 28 to not be running. Responsive to expiration of the HARQ stall timer, the wireless device 14 starts or re-starts the at least one of the one or more timers 28 (e.g., the DRX inactivity timer).

Figure 4:
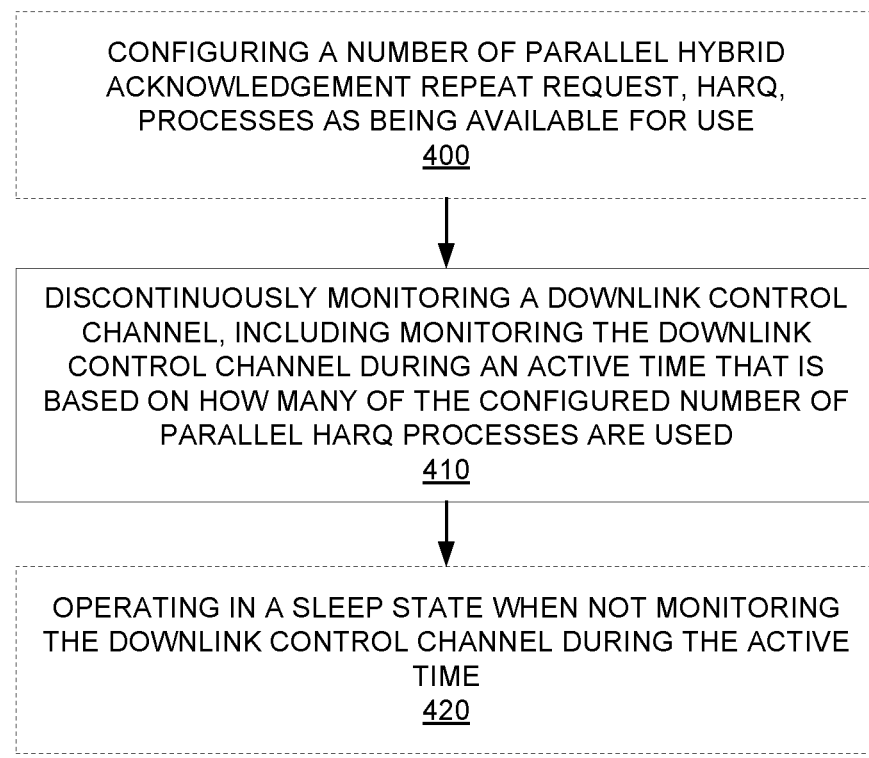
FIG. 4 is a logic flow diagram of a method performed by a wireless device according to some embodiments.

In view of the modifications and variations herein, FIG. 4 depicts a method performed by a wireless device 14 configured for use in a wireless communication system 10 (e.g., a non-terrestrial wireless communication system, such as a satellite communication system) in accordance with particular embodiments. The method in some embodiments includes configuring a number of parallel hybrid automatic repeat request, HARQ, processes 18 as being available for use (e.g., in a certain communication direction, such as uplink or downlink) (Block 400). In some embodiments, this configuring may be based on receiving control signaling indicating this number of configured parallel HARQ processes. Or, if no such control signaling is received, the configuring may be according to a default number of configured parallel HARQ processes.

Regardless, the method as shown may also include discontinuously monitoring a downlink control channel 20 (e.g., PDCCH) (Block 410). This discontinuous monitoring may include monitoring the downlink control channel 20 during an active time 24. In some embodiments, the active time 24 is based on (e.g., a function of or otherwise dependent on) how many of the configured number of parallel HARQ processes 18 are used. In one or more embodiments, for instance, the active time 24 is based on whether all of the configured number of parallel HARQ processes 18 are used (or are being used). In some embodiments, the active time 24 being based on how many of the configured number of parallel HARQ processes 18 are used means that the time(s) during which the wireless device 14 monitors the downlink control channel 20 is a function of or otherwise depends on how many of the configured number of parallel HARQ processes 18 are being used at any given time, e.g., whether all of the configured number of parallel HARQ processes 18 are or are being used at any given time. If for instance all of the configured number of parallel HARQ processes 18 are being used over a certain time interval, the wireless device 14 in some embodiments may be configured to not monitor the downlink control channel 22 during at least some of that time interval.

In some embodiments, for example, the active time 14 includes times while one or more timers (e.g., a DRX inactivity timer) are running. In this case, the method may further comprise controlling at least one of the one or more timers (e.g., a DRX inactivity timer) based on how many of the configured number of parallel HARQ processes 18 are being used (e.g., based on whether all of the configured number of parallel HARQ processes 18 are used (or are being used). In one or more of these embodiments, this may comprise controlling the at least one of the one or more timers to not be running during a time interval occurring after a last available one of the configured number of parallel HARQ processes is put into use. Alternatively or additionally, this may comprise, responsive to detecting that all of the configured number of parallel HARQ processes are used, controlling the at least one of the one or more timers to not be running during a time interval. In any of these embodiments, the at least one of the one or more timers may be controlled to not be running during the time interval, provided that the time interval is greater than a threshold.

In one or more embodiments, this time interval is a function of a time duration, e.g., where the time duration comprises a round-trip time, round-trip delay, or propagation delay in the wireless communication system. Alternatively or additionally, the time interval may be a function of a time elapsed between when a first available one of the configured number of parallel HARQ processes 18 was put into use and when a last available one of the configured number of parallel HARQ processes 18 is put into use. In this case, the time interval in some embodiments may be equal to the time duration minus the time elapsed. Regardless, controlling in some embodiments may comprise stopping, or refraining from starting, the at least one of the one or more timers 28, responsive to either: a last available one of the configured number of parallel HARQ processes 18 being put into use; or detecting that all of the configured number of parallel HARQ processes 18 are used. Or, more particularly, controlling may comprise, provided that the time interval is greater than a threshold, stopping, or refraining from starting, the at least one of the one or more timers 28, responsive to either: a last available one of the configured number of parallel HARQ processes 18 being put into use; or detecting that all of the configured number of parallel HARQ processes 18 are used.

In some embodiments that utilize a threshold, the wireless device 14 may receive control signaling that indicates a value of the threshold. The control signaling for instance be RRC signaling, be included in a DCI message, or be include in system information.

In some embodiments, controlling may further comprise controlling the at least one of the one or more timers 28, or a different one of the one or more timers, to run upon or after expiration of the time interval.

One or more embodiments may control the active time 24 in these and other ways through use of a certain timer 30, e.g., referred to for convenience as a HARQ stall timer. For example, in some embodiments, responsive to a last available one of the configured number of parallel HARQ processes 18 being put into use, the wireless device 14 starts a HARQ stall timer 30 with a value corresponding to the time interval, e.g., if the time interval is greater than a threshold. While the HARQ stall timer 30 is running, the wireless device 14 controls the at least one of the one or more timers 28 to not be running. Responsive to expiration of the HARQ stall timer 30, the wireless device 14 starts or re-starts the at least one of the one or more timers 28 (e.g., the DRX inactivity timer).

In some embodiments, then, the active time 24 is based on occurrence of HARQ stalling, where HARQ stalling occurs when all of the configured number of parallel HARQ processes 18 are used.

In some embodiments, the active time 24 is also based on a time duration that comprises a round-trip time, round-trip delay, or propagation delay in the wireless communication system 10.

In some embodiments, the method also includes operating in a sleep state when not monitoring the downlink control channel 20 during the active time 24 (Block 420).

Embodiment E1 described below may represent one example implementation of the method in FIG. 4.

Figure 5:
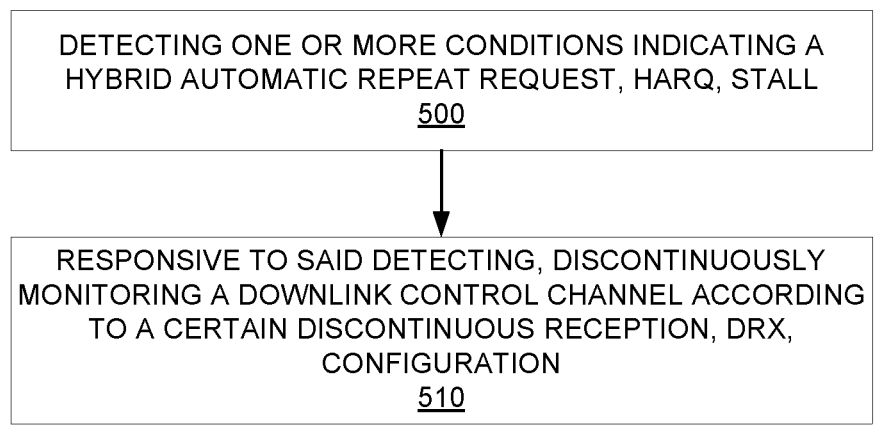
FIG. 5 is a logic flow diagram of a method performed by a wireless device according to other embodiments.

FIG. 5 depicts a method performed by a wireless device 14 configured for use in a wireless communication system 10 (e.g., a non-terrestrial wireless communication system, such as a satellite communication system) in accordance with other particular embodiments. The method includes detecting one or more conditions indicating a hybrid automatic repeat request, HARQ, stall (Block 500). The method also includes, responsive to said detecting, discontinuously monitoring a downlink control channel 20 according to a certain discontinuous reception, DRX, configuration (Block 510).

In some embodiments, the one or more conditions include all configured parallel HARQ processes being used.

In some embodiments, the certain DRX configuration includes a DRX cycle length and/or an onDuration period length that is based on a time duration, where the time duration comprises a round-trip time, round-trip delay, or propagation delay in the wireless communication system.

Embodiment E3 may be one example application of the method in FIG. 5.

Although not shown, other embodiments herein include a method performed by a wireless device 14 configured for use in a wireless communication system 10. The method may comprise discontinuously monitoring a downlink control channel 20, including monitoring the downlink control channel 20 during an active time 24 that is based on availability of parallel HARQ processes 18 for use.

Still other embodiments herein include a method performed by a wireless device 14 configured for use in a wireless communication system 10. The method may comprise discontinuously monitoring a downlink control channel 20, including monitoring the downlink control channel 20 during an active time 24 that is based on occurrence of hybrid automatic repeat request, HARQ, stalling.

Figure 6:
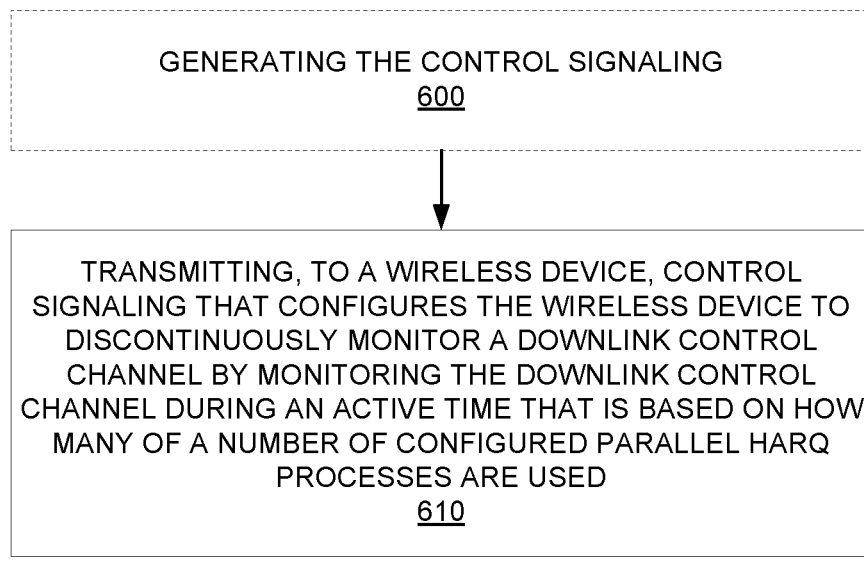
FIG. 6 is a logic flow diagram of a method performed by a network node according to some embodiments.

FIG. 6 depicts a method performed by network node (e.g., network node 12) configured for use in a wireless communication system 10 (e.g., a non-terrestrial wireless communication system, such as a satellite communication system) in accordance with other particular embodiments. The method may include transmitting, to a wireless device 14, control signaling that configures the wireless device 14 to discontinuously monitor a downlink control channel 20 by monitoring the downlink control channel 20 during an active time 24 that is based on how many of a number of configured parallel HARQ processes 18 are used (Block 610).

In some embodiments, the active time 24 includes times while one or more timers 28 at the wireless device 14 are running. In this case, the control signaling may configure the wireless device 14 to control at least one of the one or more timers 28 (e.g., a DRX inactivity timer) to not be running during a time interval occurring after a last available one of the configured number of parallel HARQ processes 18 is put into use. In one or more such embodiments, the time interval is a function of a time duration, e.g., where the time duration comprises a round-trip time, round-trip delay, or propagation delay in the wireless communication system 10. Alternatively or additionally, the time interval may be a function of a time elapsed between when a first available one of the configured number of parallel HARQ processes 18 was put into use and when a last available one of the configured number of parallel HARQ processes 18 is put into use. In this case, the time interval in some embodiments may be equal to the time duration minus the time elapsed. In any event, the control signaling in some embodiments configures the wireless device 14 to control the at least one of the one or more timers 28 (e.g., the DRX inactivity timer) to not be running during the time interval, provided that the time interval is greater than a threshold. The control signaling transmitted by the network node may in some embodiments indicate this threshold, i.e., the value of the threshold.

In some embodiments, the control signaling is RRC signaling, is included in a DCI message, or is included in system information.

Regardless, the method in some embodiments also includes generating the control signaling (Block 600).

Figure 7:
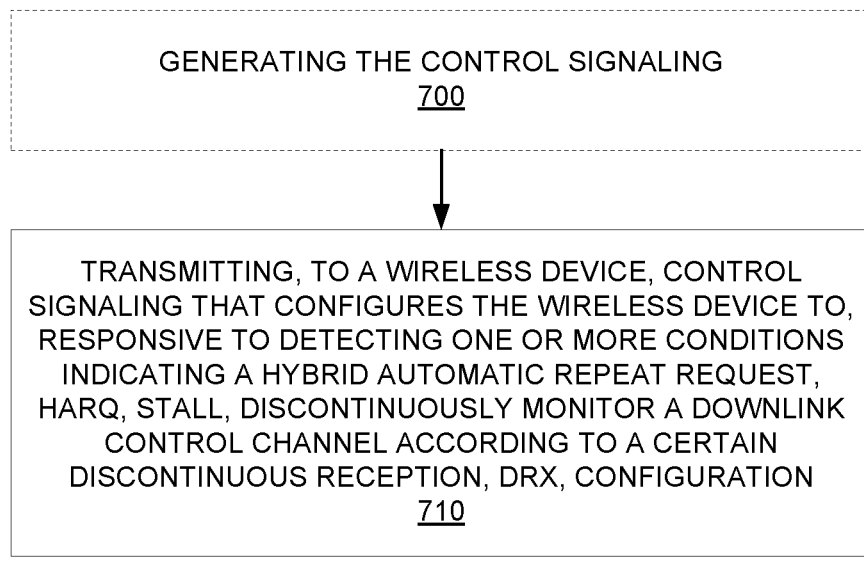
FIG. 7 is a logic flow diagram of a method performed by a network node according to other embodiments.

FIG. 7 depicts a method performed by network node (e.g., network node 12) configured for use in a wireless communication system 10 (e.g., a non-terrestrial wireless communication system, such as a satellite communication system) in accordance with other particular embodiments. The method may include transmitting, to a wireless device 14, control signaling that configures the wireless device 14 to, responsive to detecting one or more conditions indicating a hybrid automatic repeat request, HARQ, stall, discontinuously monitor a downlink control channel 20 according to a certain discontinuous reception, DRX, configuration (Block 710). In some embodiments, for example, the control signaling indicates the certain DRX configuration. For instance, the certain DRX configuration may include a DRX cycle length and/or an onDuration period length that is based on a time duration, e.g., where the time duration comprises a round-trip time, round-trip delay, or propagation delay in the wireless communication system 10.

In one or more embodiments, the one or more conditions include all configured parallel HARQ processes being used.

In some embodiments, the method also include generating the control signaling (Block 700).

Figure 8:
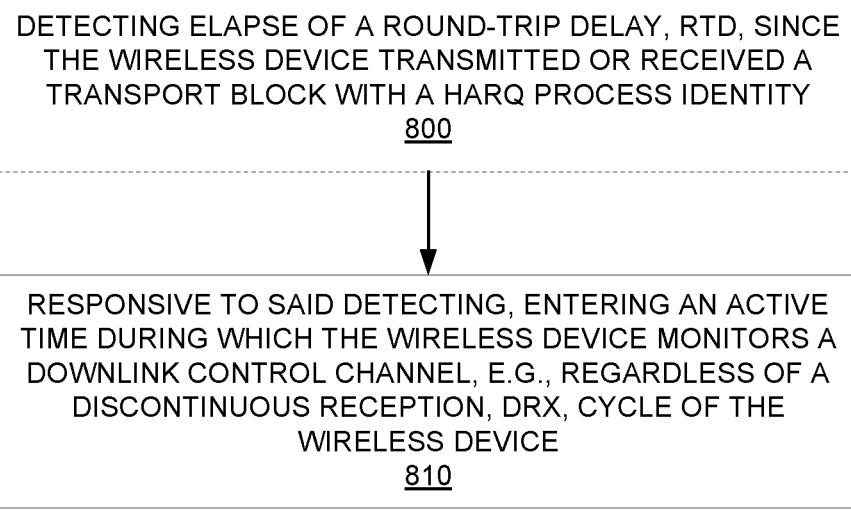
FIG. 8 is a logic flow diagram of a method performed by a wireless device according to some embodiments.

FIG. 8 depicts a method performed by a wireless device 14 configured for use in a wireless communication system 10 (e.g., a non-terrestrial wireless communication system, such as a satellite communication system) in accordance with other particular embodiments. The method includes detecting elapse of a round-trip delay (RTD) since the wireless device 14 transmitted or received a transport block with a HARQ process identity (Block 800). The method further includes, responsive to said detecting, entering an active time 24 during which the wireless device 14 monitors a downlink control channel 20, e.g., regardless of a discontinuous reception (DRX) cycle of the wireless device 14 (Block 810).

In some embodiments, for example, said entering comprises starting a timer responsive to said detecting, where the wireless device 14 is configured to monitor the downlink control channel 20 while the timer is running. The timer may for instance be a drx-InactivityTimer, a re-transmission timer, or a new timer.

In some embodiments, the active time 24 is entered regardless of whether the transport block was erroneously decoded. The method thereby differs from existing approaches for use of a re-transmission timer (e.g., drx-HARQ-RTT-TimerDL) because with that timer the wireless device would only enter active time if the first transport block is erroneously decoded in every block of max HARQ retransmissions ("HARQ stalling block"), which in generally will not happen.

Note that the active time 24 as used herein includes the time(s) during which the wireless device 14 monitors the downlink control channel 20, e.g., while in DRX mode or operation. In some embodiments, the wireless device 14 may operate in a sleep mode when not monitoring the downlink control channel 20, e.g., outside of the active time 24.

Embodiments herein also include corresponding apparatuses. Embodiments herein for instance include a wireless device configured to perform any of the steps of any of the embodiments described above for the wireless device.

Embodiments also include a wireless device comprising processing circuitry and power supply circuitry. The processing circuitry is configured to perform any of the steps of any of the embodiments described above for the wireless device. The power supply circuitry is configured to supply power to the wireless device.

Embodiments further include a wireless device comprising processing circuitry. The processing circuitry is configured to perform any of the steps of any of the embodiments described above for the wireless device. In some embodiments, the wireless device further comprises communication circuitry.

Embodiments further include a wireless device comprising processing circuitry and memory. The memory contains instructions executable by the processing circuitry whereby the wireless device is configured to perform any of the steps of any of the embodiments described above for the wireless device.

Embodiments moreover include a user equipment (UE). The UE comprises an antenna configured to send and receive wireless signals. The UE also comprises radio front-end circuitry connected to the antenna and to processing circuitry, and configured to condition signals communicated between the antenna and the processing circuitry. The processing circuitry is configured to perform any of the steps of any of the embodiments described above for the wireless device. In some embodiments, the UE also comprises an input interface connected to the processing circuitry and configured to allow input of information into the UE to be processed by the processing circuitry. The UE may comprise an output interface connected to the processing circuitry and configured to output information from the UE that has been processed by the processing circuitry. The UE may also comprise a battery connected to the processing circuitry and configured to supply power to the UE.

Embodiments herein also include a radio network node configured to perform any of the steps of any of the embodiments described above for the radio network node.

Embodiments also include a radio network node comprising processing circuitry and power supply circuitry. The processing circuitry is configured to perform any of the steps of any of the embodiments described above for the radio network node. The power supply circuitry is configured to supply power to the radio network node.

Embodiments further include a radio network node comprising processing circuitry. The processing circuitry is configured to perform any of the steps of any of the embodiments described above for the radio network node. In some embodiments, the radio network node further comprises communication circuitry.

Embodiments further include a radio network node comprising processing circuitry and memory. The memory contains instructions executable by the processing circuitry whereby the radio network node is configured to perform any of the steps of any of the embodiments described above for the radio network node.

More particularly, the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 9:
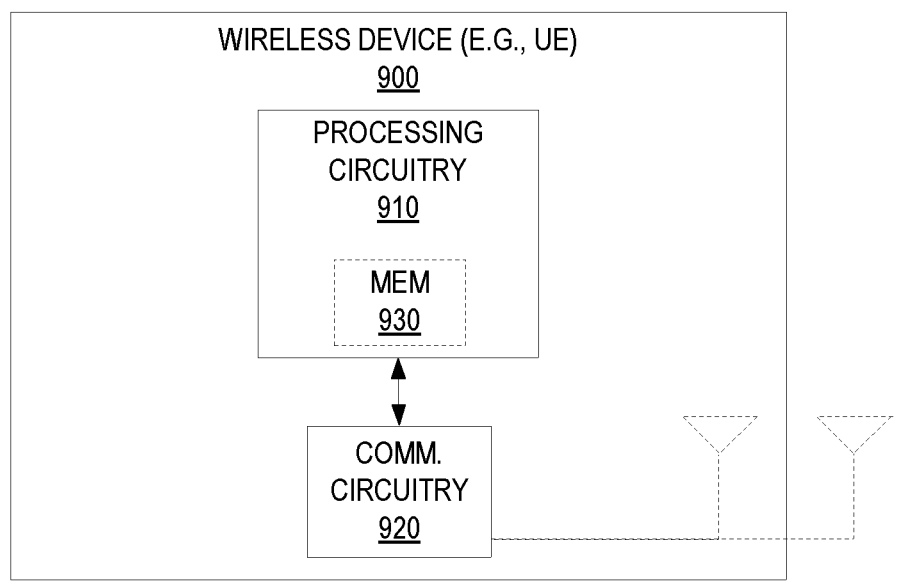
FIG. 9 is a block diagram of a wireless device according to some embodiments.

FIG. 9 for example illustrates a wireless device 900 (e.g., wireless device 14) as implemented in accordance with one or more embodiments. As shown, the wireless device 900 includes processing circuitry 910 and communication circuitry 920. The communication circuitry 920 (e.g., radio circuitry) is configured to transmit and/or receive information to and/or from one or more other nodes, e.g., via any communication technology. Such communication may occur via one or more antennas that are either internal or external to the wireless device 900. The processing circuitry 910 is configured to perform processing described above, e.g., in FIGS. 4 and/or 5, such as by executing instructions stored in memory 930. The processing circuitry 910 in this regard may implement certain functional means, units, or modules.

Figure 10:
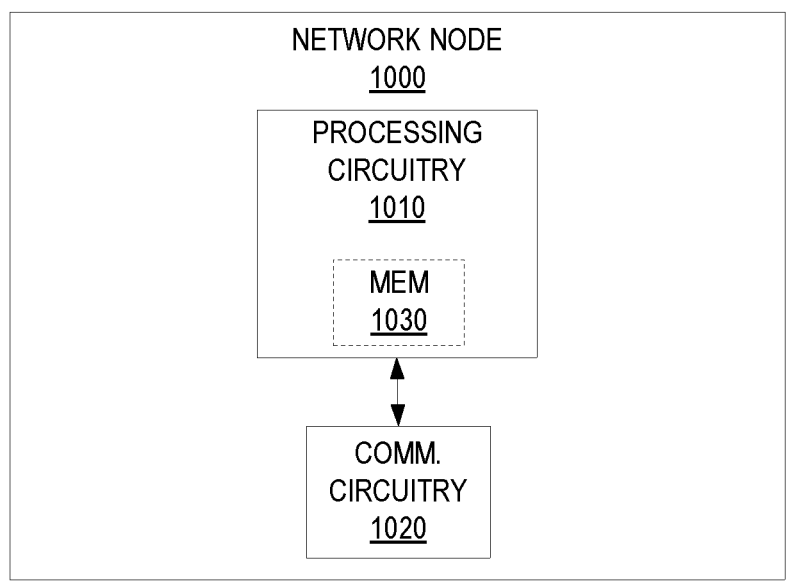
FIG. 10 is a block diagram of a network node according to some embodiments.

FIG. 10 illustrates a network node 1000 (e.g., network node 12) as implemented in accordance with one or more embodiments. As shown, the network node 1000 includes processing circuitry 1010 and communication circuitry 1020. The communication circuitry 1020 is configured to transmit and/or receive information to and/or from one or more other nodes, e.g., via any communication technology. The processing circuitry 1010 is configured to perform processing described above, e.g., in FIG. 6 or 7, such as by executing instructions stored in memory 1030. The processing circuitry 1010 in this regard may implement certain functional means, units, or modules.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

There is an ongoing resurgence of satellite communications. Several plans for satellite networks have been announced in the past few years. The target services vary, from backhaul and fixed wireless, to transportation, to outdoor mobile, to internet-of-things (IoT). Satellite networks could complement mobile networks on the ground by providing connectivity to underserved areas and multicast/broadcast services.

To benefit from the strong mobile ecosystem and economy of scale, adapting the terrestrial wireless access technologies including Long Term Evolution (LTE) and New Radio (NR) for satellite networks is drawing significant interest. For example, the $3^{rd}$ Generation Partnership Project (3GPP) completed an initial study in Release 15 on adapting NR to support non-terrestrial networks (NTNs) (mainly satellite networks). See TR 38.811, Study on New Radio (NR) to support non-terrestrial networks. This initial study focused on the channel model for the non-terrestrial networks, defining deployment scenarios, and identifying the key potential impacts. 3GPP is conducting a follow-up study item in Release 16 on solutions evaluation for NR to support non-terrestrial networks. RP-181370, Study on solutions evaluation for NR to support non-terrestrial Network.

A satellite radio access network usually includes the following components: (i) Gateway that connects satellite network to core network; (ii) Satellite that refers to a space-borne platform; (iii) Terminal that refers to user equipment; (iv) Feeder link that refers to the link between a gateway and a satellite; and (v) Service link that refers to the link between a satellite and a terminal. The link from gateway to terminal is often called forward link, and the link from terminal to gateway is often called return link. Depending on the functionality of the satellite in the system, there are two transponder options. With a bent pipe transponder, the satellite forwards the received signal back to the earth with only amplification and a shift from uplink frequency to downlink frequency. With a regenerative transponder, the satellite includes on-board processing to demodulate and decode the received signal and regenerate the signal before sending it back to the earth.

Depending on the orbit altitude, a satellite may be categorized as low earth orbit (LEO), medium earth orbit (MEO), or geo-stationary earth orbit (GEO). LEO has typical heights ranging from 250-1,500 km, with orbital periods ranging from 90-130 minutes. MEO has typical heights ranging from 5,000-25,000 km, with orbital periods ranging from 2-14 hours. And GEO has typical heights of about 35,786 km, with an orbital period of 24 hours.

A satellite typically generates several beams over a given area. The footprint of a beam is usually in an elliptic shape, which has been traditionally considered as a cell. The footprint of a beam is also often referred to as a spotbeam. The footprint of a spotbeam may move over the earth surface with the satellite movement or may be earth fixed with some beam pointing mechanism used by the satellite to compensate for its motion. The size of a spotbeam depends on the system design, which may range from tens of kilometers to a few thousands of kilometers.

Figure 11:
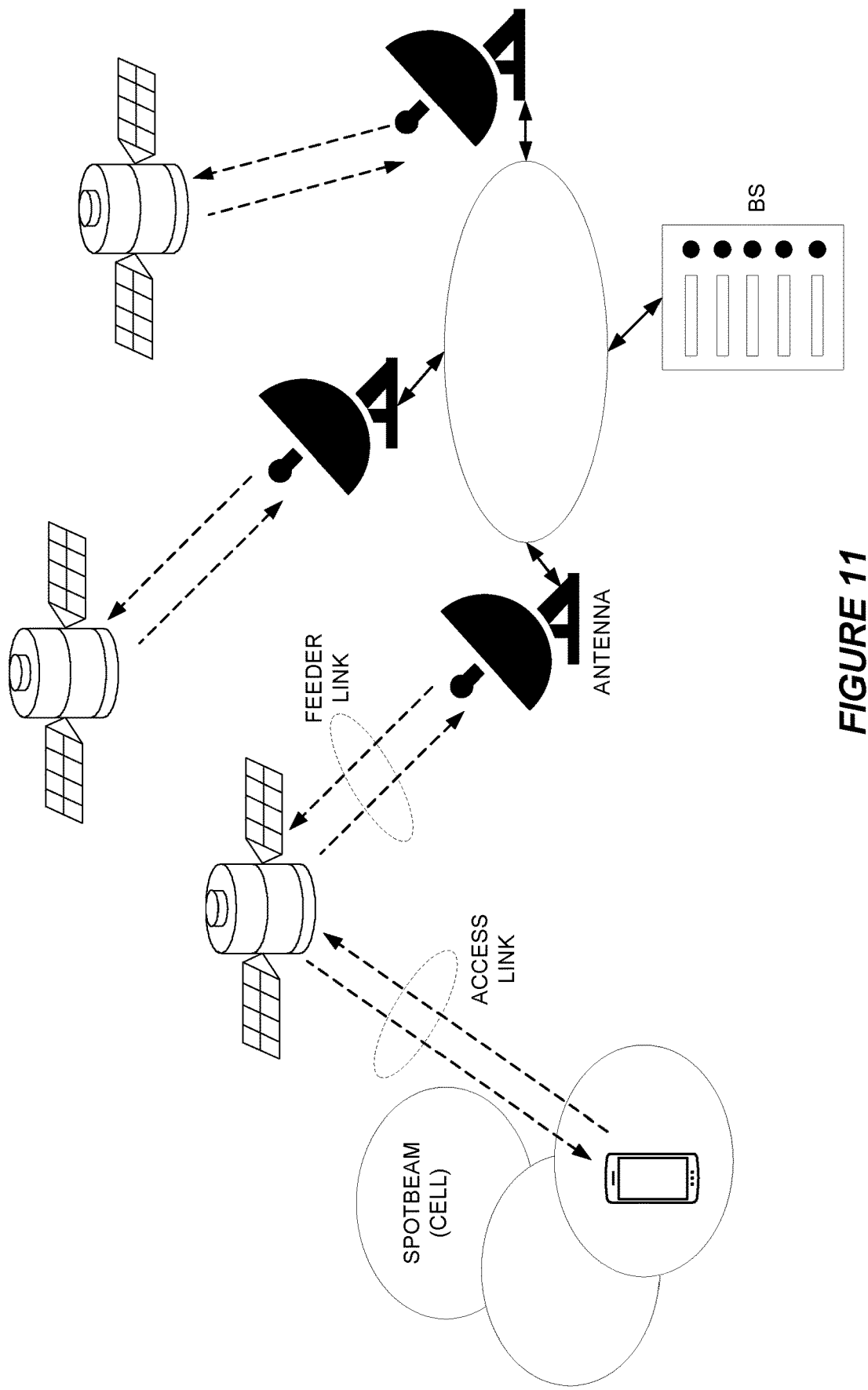
FIG. 11 is a block diagram of a satellite network with bent pipe transponders according to some embodiments.

FIG. 11 shows an example architecture of a satellite network with bent pipe transponders.

The two main physical phenomena that affect satellite communications system design are the long propagation delay and Doppler effects. The Doppler effects are especially pronounced for LEO satellites.

Propagation delay is a main physical phenomenon in a satellite communication system that makes the design different from that of a terrestrial mobile system. For a bent pipe satellite network, the following delays are relevant. One-way delay is from the base station (BS) to the user equipment (UE) via the satellite, or the other way around. Round-trip delay is from the BS to the UE via the satellite and from the UE back to the BS via the satellite. Differential delay is the delay difference of two selected points in the same spotbeam.

Note that there may be additional delay between the ground BS antenna and BS, which may or may not be collocated. This delay depends on deployment. If the delay cannot be ignored, it should be taken into account in the communications system design.

The propagation delay depends on the length of the signal path, which further depends on the elevation angles of the satellite seen by the BS and UE on the ground. The minimum elevation angle is typically more than 10° for UE and more than 5° for BS on the ground. These values will be assumed in the delay analysis below.

The following Tables 1 and 2 are taken from 3GPP TR 38.811. Table 1 shows propagation delays for a GEO satellite at 35,786 km, whereas Table 2 shows propagation delays for NGSO satellites. Observe that the round-trip delay is much larger in satellite systems. For example, it is about 545 ms for a GEO satellite system. In contrast, the round-trip time is normally no more than 1 ms for typical terrestrial cellular networks.

TABLE 1

| | GEO at 35786 km | | |
|---|---|---|---|
| Elevation angle | Path | D (km) | Time (ms) |
| UE: 10° | satellite - UE | 40586 | 135.286 |
| GW: 5° | satellite - gateway | 41126.6 | 137.088 |
| 90° | satellite - UE | 35786 | 119.286 |
| | Bent Pipe satellite | | |
| One way delay | Gateway-satellite_UE | 81712.6 | 272.375 |
| Round trip Time | Twice | 163425.3 | 544.751 |
| | Regenerative Satellite | | |
| One way delay | Satellite -UE | 40586 | 135.286 |
| Round Trip Time | Satellite-UE-Satellite | 81172 | 270.572 |

The differential delay is mainly due to the different path lengths of the access links, since the feeder link is normally the same for terminals in the same spotbeam. Further, the differential delay is mainly determined by the size of the spotbeam. It may range from sub-millisecond (for spotbeam on the order of tens of kilometres) to tens of millisecond (for spotbeam on the order of thousands of kilometres).

It is an objective to evaluate solutions for propagation delay, including identifying timing requirements and solutions on layer 2 aspects, e.g., Medium Access Control (MAC), Radio Link Control (RLC), and Radio Resource Control (RRC), to support non-terrestrial network propagation delays considering Frequency Division Duplexing (FDD) and Time Division Duplexing (TDD) mode. This includes radio link management.

The coverage pattern of NTN is described in TR 38.811 in Section 4.6 as follows.

Satellite or aerial vehicles typically generate several beams over a given area. The footprint of the beams is typically elliptic shape.

The beam footprint may be moving over the earth with the satellite or the aerial vehicle motion on its orbit. Alternatively, the beam footprint may be earth fixed, in such case some beam pointing mechanisms (mechanical or electronic steering feature) will compensate for the satellite or the aerial vehicle motion.

TABLE 2

| | | LEO at 600 km | | LEO at 1500 km | | MEO at 10000 km | |
|---|---|---|---|---|---|---|---|
| Elevation angle | Path | Distance D (km) | Delay (ms) | Distance D (km) | Delay (ms) | Distance D (km) | Delay (ms) |
| UE: 10° | satellite - UE | 1932.24 | 6,440 | 3647.5 | 12,158 | 14018.16 | 46.727 |
| GW: 5° | satellite - gateway | 2329.01 | 7.763 | 4101.6 | 13.672 | 14539.4 | 48.464 |
| 90° | satellite - UE | 600 | 2 | 1500 | 5 | 10000 | 33.333 |
| | Bent pipe satellite | | | | | | |
| One way delay | Gateway-satellite UE | 4261.2 | 14.204 | 7749.2 | 25.83 | 28557.6 | 95.192 |
| Round Trip Delay | Twice | 8522.5 | 28.408 | 15498.4 | 51.661 | 57115.2 | 190.38 |
| | Regenerative satellite | | | | | | |
| One way delay | Satellite -UE | 1932.24 | 6.44 | 3647.5 | 12.16 | 14018.16 | 46.73 |
| Round Trip Delay | Satellite-UE-Satellite | 3864.48 | 12.88 | 7295 | 24.32 | 28036.32 | 93.45 |

Generally, within spot beam covering one cell, the delay can be divided into a common delay component and a differential delay component. The common delay (e.g., in the form of a round-trip time, RTT) is the same for all UEs in the cell and is determined with respect to a reference point in the spot beam. In contrast, the differential delay is different for different UEs which depends on the propagation delay between the reference point and the point at which a given UE is positioned within the spot beam. The common delay plus the differential delay in some embodiments may be or reflect a round-trip delay (RTD).

TABLE 3

| | Typical beam foot print size | | |
|---|---|---|---|
| | Attributes | | |
| | GEO | Non-GEO | Aerial |
| Beam foot print size in diameter | 200-1000 km | 100-500 km | 5-200 km |

Figure 12:
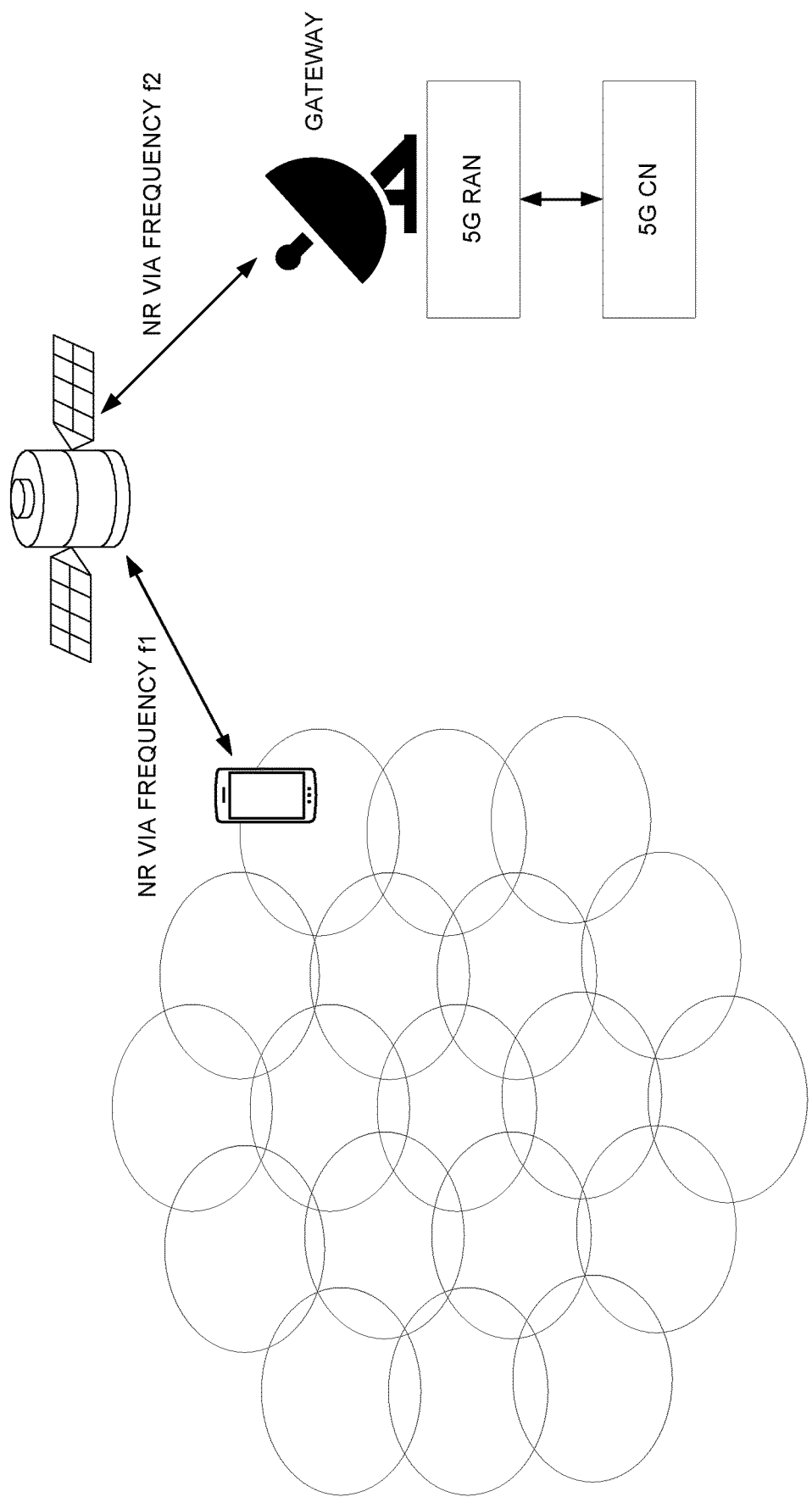
FIG. 12 is a block diagram of a transparent (bent-pipe) satellite/high-altitude pseudo-satellite according to some embodiments.
Figure 13:
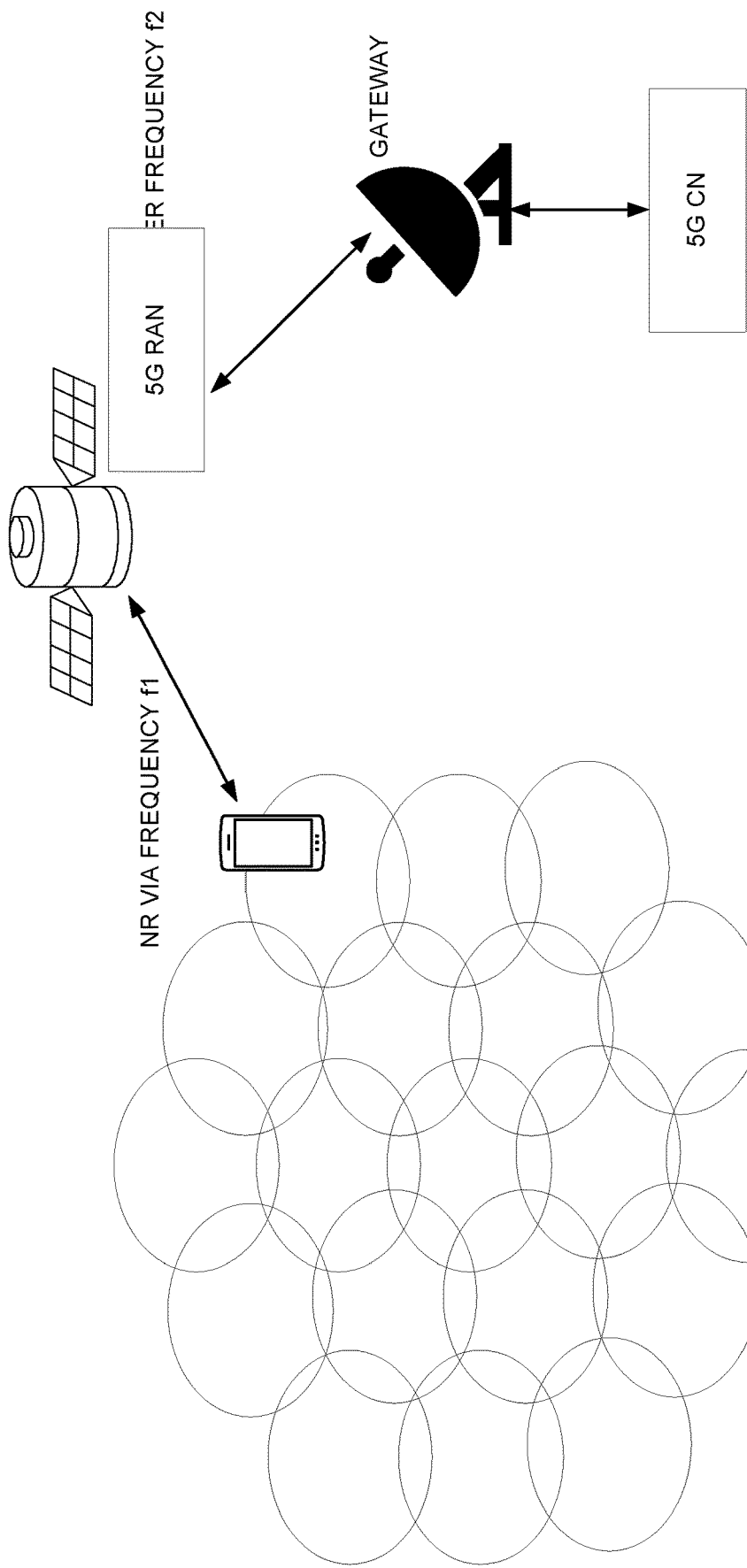
FIG. 13 is a block diagram of a non-transparent (on-board processor) satellite/high-altitude pseudo-satellite according to some embodiments.

Typical beam patterns of various NTN access networks are depicted in FIGS. 12 and 13. In particular, FIG. 12 shows a transparent (bent-pipe) satellite/HAPS (high-altitude pseudo-satellite). FIG. 13 shows a non-transparent (on board processor) satellite/HAPS.

Scenarios for the NTN work are as follows. A Non-Terrestrial Network (NTN) typically features the following elements: (i) One or several sat-gateways that connect the Non-Terrestrial Network to a public data network; (ii) a GEO satellite is fed by one or several sat-gateways which are deployed across the satellite targeted coverage (e.g. regional or even continental coverage); (iii) A Non-GEO satellite served successively by one sat-gateway at a time. The system ensures service and feeder link continuity between the successive serving sat-gateways with sufficient time duration to proceed with mobility anchoring and handover.

Four scenarios are considered as depicted in Table 4 and are detailed in Table 5.

TABLE 4

Reference scenarios

|  | Transparent satellite | Regenerative satellite |
|---|---|---|
| GEO based non-terrestrial access network | Scenario A | Scenario B |
| LEO based non-terrestrial access network | Scenario C | Scenario D |

TABLE 5

Reference scenario parameters

| Scenarios | GEO based non-terrestrial access network (Scenario A and B) | LEO based non-terrestrial access network (Scenario C & D) |
|---|---|---|
| Orbit type | notional station keeping position fixed in terms of elevation/azimuth with respect to a given earth point | circular orbiting around the earth |
| Altitude | 35,786 km | 600 km<br>1,200 km |
| Spectrum (service link) | <6 GHz (e.g. 2 GHz)<br>>6 GHz (e.g. DL 20 GHz, UL 30 GHz) | |
| Max channel bandwidth (service link) | 30 MHz for band <6 GHz<br>400 MHz for band >6 GHz | |
| Payload | Scenario A : Transparent (including radio frequency function only)<br>Scenario B: regenerative (including all or part of RAN functions) | Scenario C: Transparent (including radio frequency function only)<br>Scenario D: Regenerative (including all or part of RAN functions) |
| Inter-Satellite link | No | Scenario C: No<br>Scenario D: Yes |
| Earth-fixed beams | Yes | Scenario C: No<br>(the beams move with the satellite)<br>Scenario D, option 1: Yes<br>(steering beams), see note 1<br>Scenario D, option 2: No<br>(the beams move with the satellite) |
| Max beam foot print diameter at nadir | 500 km | 200 km |
| Min Elevation angle for both sat-gateway and user equipment | 10° | 10° |
| Max distance between satellite and user equipment at min elevation angle | 40,586 km | 1,932 km (600 km altitude)<br>3,131 km (1,200 km altitude) |
| Max Round Trip Delay (propagation delay only) | Scenario A: 562 ms (service and feeder links)<br>Scenario B: 281 ms | Scenario C: 25.76 ms<br>(transparent payload: service and feeder links)<br>Scenario D: 12.88 ms<br>(regenerative payload: service link only) |
| Max delay variation within a beam (earth fixed user equipment) | 16 ms | 4.44 ms (600 km)<br>6.44 ms (1200 km) |
| Max differential delay within a beam | 1.6 ms | 0.65 ms (*) |
| Max Doppler shift (earth fixed user equipment) | 0.93 ppm | 24 ppm (*) |
| Max Doppler shift variation (earth fixed user equipment) | 0.000045 ppm/s | 0.27 ppm/s (*) |
| User equipment motion on the earth | 1000 km/h (e.g. aircraft) | 500 km/h (e.g. high speed train)<br>Possibly 1000 km/h (e.g. aircraft) |
| User equipment antenna types | Omnidirectional antenna (linear polarisation), assuming 0 dBi<br>Directive antenna (up to 60 cm equivalent aperture diameter in circular polarisation) | |
| User equipment Tx power | Omnidirectional antenna: UE power class 3 with up to 200 mW<br>Directive antenna: up to 4 W | |
| User equipment Noise figure | Omnidirectional antenna: 7 dB<br>Directive antenna: 1.2 dB | |
| Service link | 3GPP defined New Radio | |
| Feeder link | 3GPP or non-3GPP defined Radio interface | 3GPP or non-3GPP defined Radio interface |

Note each satellite has the capability to steer beams towards fixed points on earth using beamforming techniques. This is applicable for a period of time corresponding to the visibility time of the satellite. Note also that max delay variation within a beam (earth fixed user equipment) is calculated based on Min Elevation angle for both gateway and user equipment. Note further that max differential delay within a beam is calculated based on Max beam foot print diameter at nadir.

For scenario D, which is LEO with regenerative payload, both earth-fixed and earth moving beams have been listed. So, factoring in the fixed/non-fixed beams, there is an additional scenario. The complete list of 5 scenarios in 38.821 is then:

Scenario A—GEO, transparent satellite, Earth-fixed beams;

Scenario B—GEO, regenerative satellite, Earth fixed beams;

Scenario C—LEO, transparent satellite, Earth-moving beams;

Scenario D1—LEO, regenerative satellite, Earth-fixed beams;

Scenario D2—LEO, regenerative satellite, Earth-moving beams.

Existing Hybrid Automatic Repeat Request (HARQ) procedures at the PHY/MAC layer have been designed for terrestrial networks where the round-trip propagation delay is restricted to be within 1 ms. With the HARQ protocol, a transmitter needs to wait for the feedback from the receiver before sending new data. In case of a negative acknowledgement (NACK), the transmitter may need to resend the data packet. Otherwise, it may send new data. This stop-and-wait (SAW) procedure introduces inherent latency to the communication protocol, which may reduce the link throughput. To alleviate this issue, the existing HARQ procedure allows activating multiple HARQ processes at the transmitter. That is, the transmitter may initiate multiple transmissions in parallel without having to wait for a HARQ completion. For example, with 16 (8) HARQ processes in NR (LTE) DL, the gNB (eNB) may initiate up to 16 (8) new data transmissions without waiting for an ACK for the first packet transmission. Note that there are a sufficient number of HARQ processes for terrestrial networks where the propagation delay is typically less than 1 ms.

Figure 14:
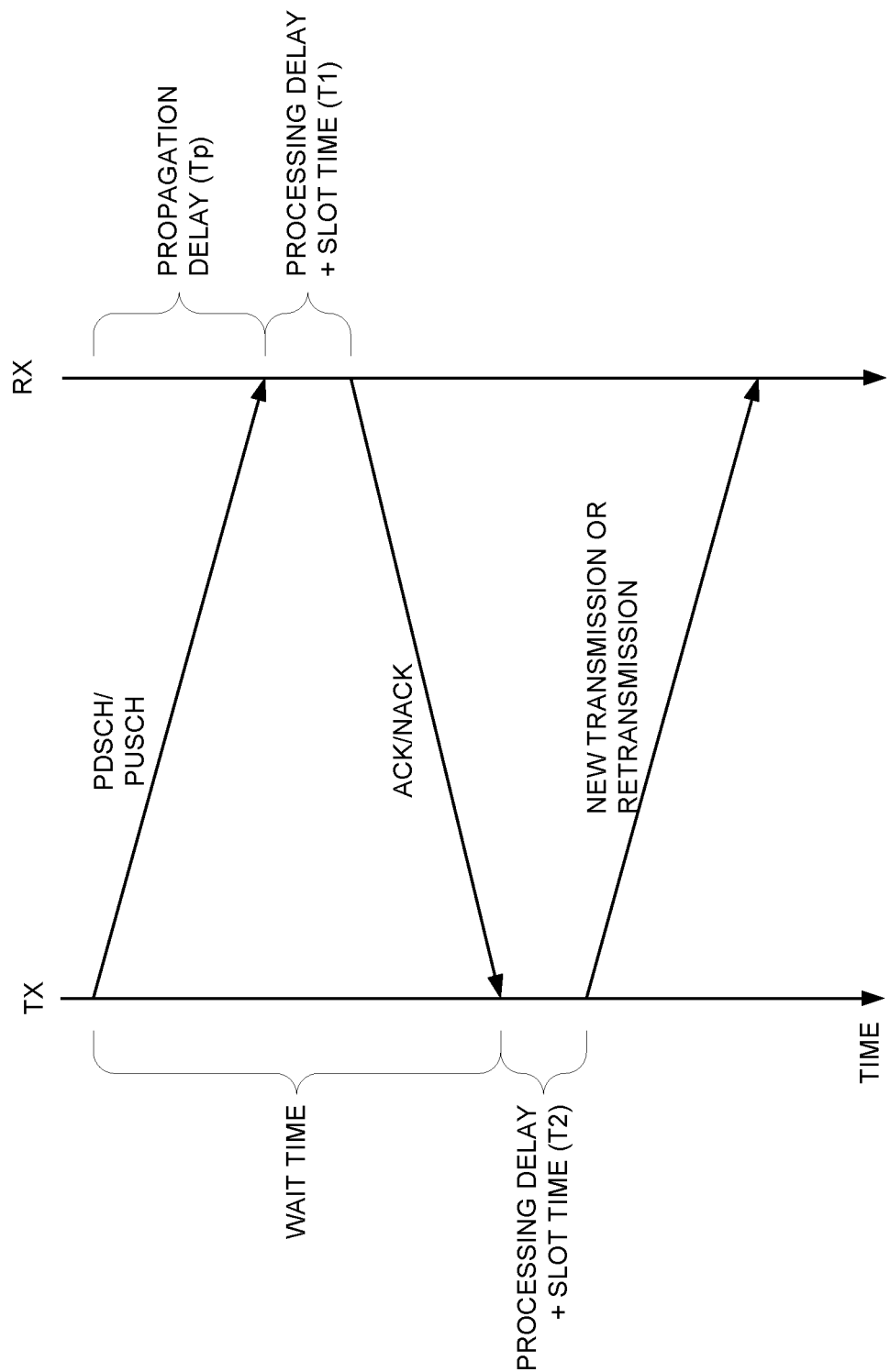
FIG. 14 is a call flow diagram that shows the various delays associated with the HARQ procedure, according to some embodiment.

FIG. 14 shows the various delays associated with the HARQ procedure, at the MAC layer. A transmitter (TX) transmits a packet to a receiver (RX), e.g., over a Physical Downlink Shared Channel (PDSCH) or a Physical Uplink Shared Channel (PUSCH. The packet first reaches the receiver after a propagation delay Tp. The receiver sends the ACK/NACK feedback after a processing/slot delay T1. The feedback reaches the data transmitter after a propagation delay Tp. The transmitter may send a retransmission or new data after a processing/slot delay T2. The required number of HARQ processes is (2Tp+T1+T2)/Ts where Ts is the slot duration.

More particularly for NR, the MAC entity includes a HARQ entity for each Serving Cell, which maintains a number of parallel HARQ processes. Each HARQ process is associated with a HARQ process identifier. For downlink, a maximum of 16 HARQ processes per cell is supported by the UE. The number of processes the UE may assume will at most be used for the downlink is configured to the UE for each cell separately by higher layer parameter nrofHARQ-processesForPDSCH, and when no configuration is provided the UE may assume a default number of 8 processes.

NR Discontinuous Reception (DRX) operation is described in Clause 5.7 in TS 38.321 v15.3.0. According to Clause 5.7 in TS 38.321, the MAC entity may be configured by RRC with a discontinuous reception (DRX) functionality that controls the UE's physical downlink control channel (PDCCH) monitoring activity. RRC controls DRX operation by configuring the following parameters: (i) drx-onDurationTimer, which is the duration at the beginning of a DRX Cycle; (ii) drx-SlotOffset, which is the delay before starting the drx-onDurationTimer; (iii) drx-InactivityTimer, which is the duration after the PDCCH occasion in which a PDCCH indicates a new UL or DL transmission for the MAC entity; (iv) drx-RetransmissionTimerDL (per DL HARQ process), which is the maximum duration until a DL retransmission is received; (v) drx-RetransmissionTimerUL (per UL HARQ process), which is the maximum duration until a grant for UL retransmission is received; (vi) drx-LongCycleStartOffset, which is the Long DRX cycle, (vii) drx-StartOffset which defines the subframe where the Long and Short DRX Cycle starts; (viii) drx-ShortCycle (optional), which is the Short DRX cycle; (ix) drx-ShortCycleTimer (optional), which is the duration the UE shall follow the Short DRX cycle; (x) drx-HARQ-RTT-TimerDL (per DL HARQ process), which is the minimum duration before a DL assignment for HARQ retransmission is expected by the MAC entity; and (xi) drx-HARQ-RTT-TimerUL (per UL HARQ process), which is the minimum duration before a UL HARQ retransmission grant is expected by the MAC entity.

When a DRX cycle is configured, the Active Time includes the time while: (i) drx-onDurationTimer or drx-InactivityTimer or drx-RetransmissionTimerDL or drx-RetransmissionTimerUL or ra-ContentionResolutionTimer is running; or (ii) a Scheduling Request is sent on the Physical Uplink Control Channel (PUCCH) and is pending; or (iii) a PDCCH indicating a new transmission addressed to the cell Radio Network Temporary Identity (C-RNTI) of the MAC entity has not been received after successful reception of a Random Access Response for the Random Access Preamble not selected by the MAC entity among the contention-based Random Access Preamble.

When DRX is configured, the detailed procedure for the MAC entity to follow is described in Clause 5.7 in TS 38.321. In particular, the MAC entity may be configured by RRC with a DRX functionality that controls the UE's PDCCH monitoring activity for the MAC entity's C-RNTI, CS-RNTI, INT-RNTI, SFI-RNTI, SP-CSI-RNTI, TPC-PUCCH-RNTI, TPC-PUSCH-RNTI, and TPC-SRS-RNTI. Here, CS stands for Configured Scheduling, INT stands for Interruption, SFI stands for Slot Format Indication, SP stands for Semi-Persistent, CSI stands for Channel State Information, TPC stands for Transmit Power Control, and SRS stands for Sounding Reference Signal. When using DRX operation, the MAC entity shall also monitor PDCCH according to requirements found in other subclauses of TS 38.321. When in RRC_CONNECTED, if DRX is configured, the MAC entity may monitor the PDCCH discontinuously using the DRX operation specified in Clause 5.8 of TS 38.321; otherwise the MAC entity shall monitor the PDCCH continuously.

In particular, when DRX is configured, the MAC entity shall:
1> if a MAC Protocol Data Unit (PDU) is received in a configured downlink assignment:
2> start the drx-HARQ-RTT-TimerDL for the corresponding HARQ process in the first symbol after the end of the corresponding transmission carrying the DL HARQ feedback;

2> stop the drx-RetransmissionTimerDL for the corresponding HARQ process.
1> if a MAC PDU is transmitted in a configured uplink grant:
  2> start the drx-HARQ-RTT-TimerUL for the corresponding HARQ process in the first symbol after the end of the first repetition of the corresponding PUSCH transmission;
  2> stop the drx-RetransmissionTimerUL for the corresponding HARQ process.
1> if a drx-HARQ-RTT-TimerDL expires:
  2> if the data of the corresponding HARQ process was not successfully decoded:
    3> start the drx-RetransmissionTimerDL for the corresponding HARQ process in the first symbol after the expiry of drx-HARQ-RTT-TimerDL.
1> if a drx-HARQ-RTT-TimerUL expires:
  2> start the drx-RetransmissionTimerUL for the corresponding HARQ process in the first symbol after the expiry of drx-HARQ-RTT-TimerUL.
1> if a DRX Command MAC Control Element (CE) or a Long DRX Command MAC CE is received:
  2> stop drx-onDurationTimer,
  2> stop drx-InactivityTimer.
1> if drx-InactivityTimer expires or a DRX Command MAC CE is received:
  2> if the Short DRX cycle is configured:
    3> start or restart drx-ShortCycleTimer in the first symbol after the expiry of drx-InactivityTimer or in the first symbol after the end of DRX Command MAC CE reception;
    3> use the Short DRX Cycle.
  2> else:
    3> use the Long DRX cycle.
1> if drx-ShortCycleTimer expires:
  2> use the Long DRX cycle.
1> if a Long DRX Command MAC CE is received:
  2> stop drx-ShortCycleTimer,
  2> use the Long DRX cycle.
1> if the Short DRX Cycle is used, and [(SFN×10)+ subframe number] modulo (drx-ShortCycle)=(drx-StartOffset) modulo (drx-ShortCycle); or
1> if the Long DRX Cycle is used, and [(SFN×10)+ subframe number] modulo (drx-LongCycle)=drx-StartOffset:
  2> start drx-onDurationTimer after drx-SlotOffset from the beginning of the subframe.
1> if the MAC entity is in Active Time:
  2> monitor the PDCCH;
  2> if the PDCCH indicates a DL transmission:
    3> start the drx-HARQ-RTT-TimerDL for the corresponding HARQ process in the first symbol after the end of the corresponding transmission carrying the DL HARQ feedback;
    3> stop the drx-RetransmissionTimerDL for the corresponding HARQ process.
  2> if the PDCCH indicates a UL transmission:
    3> start the drx-HARQ-RTT-TimerUL for the corresponding HARQ process in the first symbol after the end of the first repetition of the corresponding PUSCH transmission;
    3> stop the drx-RetransmissionTimerUL for the corresponding HARQ process.
  2> if the PDCCH indicates a new transmission (DL or UL):
    3> start or restart drx-InactivityTimer in the first symbol after the end of the PDCCH reception.
1> in current symbol n, if the MAC entity would not be in Active Time considering grants/assignments/DRX Command MAC CE/Long DRX Command MAC CE received and Scheduling Request sent 4 ms prior to symbol n when evaluating all DRX Active Time conditions as specified in this subclause:
  2> not transmit periodic SRS and semi-persistent SRS defined in TS 38.214 [7].
1> if CSI masking (csi-Mask) is setup by upper layers:
  2> in current symbol n, if onDurationTimer would not be running considering grants/assignments/DRX Command MAC CE/Long DRX Command MAC CE received 4 ms prior to symbol n when evaluating all DRX Active Time conditions as specified in this subclause:
    3> not report CSI on PUCCH.
1> else:
  2> in current symbol n, if the MAC entity would not be in Active Time considering grants/assignments/DRX Command MAC CE/Long DRX Command MAC CE received and Scheduling Request sent 4 ms prior to symbol n when evaluating all DRX Active Time conditions as specified in this subclause:
    3> not report CSI on PUCCH and semi-persistent CSI on PUSCH.

Regardless of whether the MAC entity is monitoring PDCCH or not, the MAC entity transmits HARQ feedback and aperiodic SRS defined in TS 38.214 when such is expected.

The MAC entity needs not to monitor the PDCCH if it is not a complete PDCCH occasion (e.g. the Active Time starts or ends in the middle of a PDCCH occasion).

There currently exist certain challenge(s) with existing HARQ and DRX protocol amid large propagation delays. First, the existing HARQ mechanism may not be feasible when the propagation delay is much larger than that supported by the allowed number of HARQ processes. For example, consider the scenario where NR DL is to be adopted for satellite communications. For the GEO case, the RTT propagation delay can be around 600 ms. With the NR maximum of 16 HARQ processes, the gNB needs to wait for around 600 ms before sending new data. This translates to benefitting from only a meager fraction (16/600) of the available peak throughput. Therefore, without a sufficient number of HARQ processes, the sheer magnitude of the propagation delay may render closed-loop HARQ communication impractical.

Second, the number of HARQ processes supported by the existing HARQ protocol is not sufficient to absorb the potentially large propagation delays in non-terrestrial networks. For example, Table 6 shows the required number of HARQ processes in satellite networks. The peak throughput with 16 HARQ processes and Ts=1 ms is also listed. According to Table 6, then, a substantial increase in the existing number of HARQ processes is required for operating HARQ amid large propagation delays.

TABLE 6

| Satellite | Total delay | Reqd. # HARQ processes | Available peak throughput (% of peak capacity) |
|---|---|---|---|
| LEO | ~50 ms | ~50 | ~32% |
| MEO | ~180 ms | ~180 | ~8.9% |
| GEO | ~600 ms | ~600 | ~2.7% |

Unfortunately, it is challenging to support that many HARQ processes, especially at the UE side, due to e.g. the following reasons. First, it requires large memory at both the transmitter and receiver. Second, it may require reducing the HARQ buffer size (and thus the maximum supported transport block size, TBS). Third, a large number of HARQ buffers implies a large number of HARQ receivers. Fourth, it may increase the signaling overhead for HARQ ID.

In short, the existing (PHY/MAC) HARQ mechanism is ill-suited to non-terrestrial networks or other types of networks with large propagation delays.

In non-terrestrial networks where the propagation delay is large, using the HARQ feedback loop may considerably reduce the throughput due to the inherent stop-and-wait property of the HARQ protocol. But since feedback is necessary in many services, it is important to optimize both UE and gNB procedures at these occasions.

Even if the number of HARQ processes allowed is increased in NTN (non-terrestrial networks), it is not feasible to increase it so that continuous communications can be achieved due to the complexity and memory requirement that this would inflict. As such, the UE will be stalled when the last available HARQ process id is allocated, which will force the UE to monitor the PDCCH even though nothing will be received until the roundtrip time has elapsed.

In general, the existing DRX operation does not sufficiently consider large propagation delay. The UE could be required to enter DRX by the use of existing DRX MAC CE signaling, but then the MAC entity would be required to send this signal every time the HARQ process is being stalled and the UE would need to reply with acknowledgement. The current DRX framework would also imply that the UE is only reachable when the onDuration timer is running, which could lead to even larger delays if the UE enters DRX during the propagation delay. The current framework of DRX offers no possibility to adjust the DRX cycle to be optimized when HARQ staling occurs.

Certain aspects of the present disclosure and their embodiments may provide solutions to these or other challenges. For example, some embodiments herein provide methods for the network to configure the UE to account for large propagation delays and still be as energy efficient as possible. This may allow UEs to save energy by not monitoring the PDCCH during long roundtrip delays.

For example, some embodiments herein modify section 5.7 in TS 38.321 by adding an "If case" in the text where it is described how the UE should monitor the PDCCH when the drx-InactivtyTimer is running. This event would be a specific case when HARQ stalling occurs and the UE would then be allowed to leave active time (stop the inactivity timer and start monitoring according to its (new) DRX cycle). In this way, the UE would keep track of the time when the event of HARQ stalling occurs, and set a timer to the value of RTD−(t8−t1) (according to the example herein) so that it knows when to wake up regardless of the onDuration and then start the drx-InactivityTimer again.

In any event, certain embodiments may provide one or more of the following technical advantage(s). Some embodiments introduce options enabling the UE to monitor the PDCCH discontinuously in the presence of large propagation delay due to for example when being stalled due to limited number of HARQ processes. The UE will then save energy and at the same time be reachable during these delays.

Embodiment E1: In this embodiment, the UE is allowed to not monitor the PDCCH when a certain event (HARQ stalling) occurs even if the drx-InactivityTimer is running. When the gNB or UE sends data continuously using HARQ feedback, the UE will know that it cannot receive or transmit any transport blocks (TBs) if all configured HARQ processes, in a certain direction, are allocated to already received or transmitted TBs, i.e. the UE and gNB needs to wait for feedback. In such a case, the UE should be allowed to enter its configured DRX cycle without the need to wait for its activity timer to expire, i.e., when the last HARQ process is allocated in a specific direction, the UE should stop the drx-InactivityTimer and enter the preconfigured DRX cycle if the propagation delay of the system is long enough compared to when the next probable event of receiving or transmitting data can occur. This would allow the UE to save energy but at the same time be reachable if needed.

Example of Embodiment E1: Consider an example where the UE is configured with 8 HARQ processes in the DL and a roundtrip delay is equal to RTD milliseconds. The UE receives a first TB1 at time t1 which is allocated the HARQ process ID=0. The UE then receives 6 more TBs at certain time instances fairly close or even continuously from t1 which are allocated HARQ IDs 1 through 6. When the UE at time t8, receives TB8 which is allocated the last available HARQ process ID=7, (and no new (re)transmissions have yet arrived for any other HARQ process ID), it can check the time elapsed from t1 to t8 and subtract this from the configured RTD i.e. RTD−(t8−t1). If this is larger than a configured threshold, the UE would stop its drx-InactivityTimer, if running, and enter the configured DRX cycle.

An RTD may be configured for the UE by similar ways as described in embodiment E4.

Embodiment E2: When RTD milliseconds, or a related value, has elapsed from received or transmitted TB with the oldest allocated HARQ process ID, the UE should regardless of its current DRX cycle enter active time. The UE should start its drx-InactivityTimer, re-transmissionTimer or any other timer that keeps the UE in active mode to continuously monitor the PDCCH.

Embodiment E3: The optimal energy saving contra reachability could be different at different times. Therefore, it could be beneficial if the UE is configured with a specific DRX cycle and onDuration period optimized for the HARQ stalling period, i.e. the propagation delay. The UE could be configured with this DRX settings using any of the existing procedures as described in Embodiment E4.

Embodiment E4: Signaling options for the threshold value of Embodiment 1 and/or DRX cycle of Embodiment 3.

The UE is configured with a threshold that relates to the roundtrip time of the network. When the duration between the oldest allocated HARQ process and the roundtrip time exceeds the threshold, the UE enters its preconfigured DRX cycle. The threshold and/or DRX cycle could be configured to the UE by RRC. The RRC configuration can include a value for the threshold and/or DRX cycle to use. If not configured, the DRX option is disabled for the HARQ staling process. Alternatively, the threshold and/or DRX cycle could be configured to the UE by System Information (SI). In other embodiments, the threshold and/or DRX cycle could be configured to the UE by Downlink Control Information (DCI). The DCI can indicate the length of the threshold and/or DRX period from values that are fixed in 3GPP specification. In still other embodiments, the threshold and/or DRX cycle could be configured to the UE by RRC+DCI. The DCI can indicate the length of the threshold and/or DRX period, from values that are RRC configured.

In another follow-up embodiment, if the UE is configured with HARQ stalling DRX operation during the propagation delay, it could be activate/deactivated by the use of DCI. For example, a bit in the DCI message could indicate activation or deactivation of the HARQ staling DRX process. Alternatively, HARQ stalling DRX operation could be activated/deactivated by the use of a MAC CE. That is, a MAC CE could be sent to activate or deactivate the use of HARQ staling DRX process. In other embodiments, HARQ stalling DRX operation could be activated/deactivated by the use of RRC+RNTI (Radio Network Temporary Identity). For example, it could be configured by RRC, and then activated by the use of a preconfigured RNTI used for the last allocated HARQ process.

Note that in some embodiments the UE could enter DRX due to HARQ stalling both in respect to the UL or DL, i.e., the UL and DL use different HARQ process IDs and any could trigger this. Some embodiments facilitate this for the UL by defining a new RRC parameter that configures the UE with a number of HARQ processes to use in the UL. This would then exist for the DL and for the configured grant case of the UL as well as for the dynamic scheduling of the UL.

Figure 15:
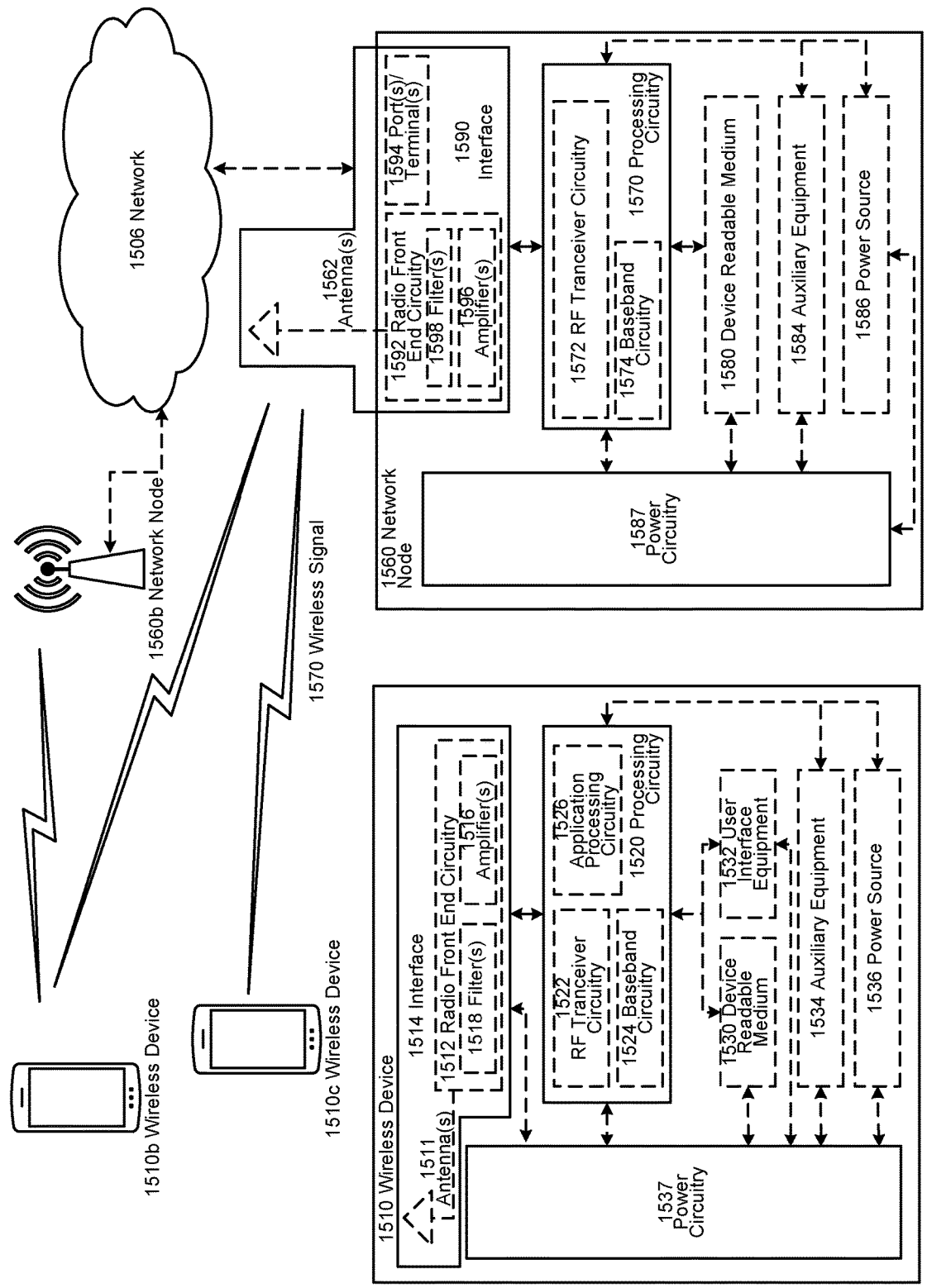
FIG. 15 is a block diagram of a wireless communication network according to some embodiments.

Although the subject matter described herein may be implemented in any appropriate type of system using any suitable components, some embodiments disclosed herein are described in relation to a wireless network, e.g., with relatively long propagation delay, roundtrip time, and/or roundtrip delay. In some embodiments, the wireless network may correspond to the non-terrestrial (e.g., satellite) system shown in FIG. 1. FIG. 15 illustrates another example of a wireless network. For simplicity, the wireless network of FIG. 15 only depicts network 1506, network nodes 1560 and 1560b, and WDs 1510, 1510b, and 1510c. In practice, a wireless network may further include any additional elements suitable to support communication between wireless devices or between a wireless device and another communication device, such as a landline telephone, a service provider, or any other network node or end device. Of the illustrated components, network node 1560 and wireless device (WD) 1510 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1506 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1560 and WD 1510 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node 1560 includes processing circuitry 1570, device readable medium 1580, interface 1590, auxiliary equipment 1584, power source 1586, power circuitry 1587, and antenna 1562. Although network node 1560 illustrated in the example wireless network of FIG. 15 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1560 are depicted as single boxes located within a larger box, or nested within multiple boxes, in practice, a network node may comprise multiple different physical components that make up a single illustrated component (e.g., device readable medium 1580 may comprise multiple separate hard drives as well as multiple RAM modules).

Similarly, network node 1560 may be composed of multiple physically separate components (e.g., a NodeB component and a RNC component, or a BTS component and a BSC component, etc.), which may each have their own respective components. In certain scenarios in which network node 1560 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1560 may be configured to support multiple radio access technologies (RATs). In such embodiments, some components may be duplicated (e.g., separate device readable medium 1580 for the different RATs) and some components may be reused (e.g., the same antenna 1562 may be shared by the RATs). Network node 1560 may also include multiple sets of the various illustrated components for different wireless technologies integrated into network node 1560, such as, for example, GSM, WCDMA, LTE, NR, WiFi, or Bluetooth wireless technologies. These wireless technologies may be integrated into the same or different chip or set of chips and other components within network node 1560.

Processing circuitry 1570 is configured to perform any determining, calculating, or similar operations (e.g., certain obtaining operations) described herein as being provided by a network node. These operations performed by processing circuitry 1570 may include processing information obtained by processing circuitry 1570 by, for example, converting the obtained information into other information, comparing the obtained information or converted information to information stored in the network node, and/or performing one or more operations based on the obtained information or converted information, and as a result of said processing making a determination.

Processing circuitry 1570 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1560 components, such as device readable medium 1580, network node 1560 functionality. For example, processing circuitry 1570 may execute instructions stored in device readable medium 1580 or in memory within processing circuitry 1570. Such functionality may include providing any of the various wireless features, functions, or benefits discussed herein. In some embodiments, processing circuitry 1570 may include a system on a chip (SOC).

In some embodiments, processing circuitry 1570 may include one or more of radio frequency (RF) transceiver circuitry 1572 and baseband processing circuitry 1574. In some embodiments, radio frequency (RF) transceiver circuitry 1572 and baseband processing circuitry 1574 may be on separate chips (or sets of chips), boards, or units, such as radio units and digital units. In alternative embodiments, part or all of RF transceiver circuitry 1572 and baseband processing circuitry 1574 may be on the same chip or set of chips, boards, or units In certain embodiments, some or all of the functionality described herein as being provided by a network node, base station, eNB or other such network device may be performed by processing circuitry 1570 executing instructions stored on device readable medium 1580 or memory within processing circuitry 1570. In alternative embodiments, some or all of the functionality may be provided by processing circuitry 1570 without executing instructions stored on a separate or discrete device readable medium, such as in a hard-wired manner. In any of those embodiments, whether executing instructions stored on a device readable storage medium or not, processing circuitry 1570 can be configured to perform the described functionality. The benefits provided by such functionality are not limited to processing circuitry 1570 alone or to other components of network node 1560, but are enjoyed by network node 1560 as a whole, and/or by end users and the wireless network generally.

Device readable medium 1580 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1570. Device readable medium 1580 may store any suitable instructions, data or information, including a computer program, software, an application including one or more of logic, rules, code, tables, etc. and/or other instructions capable of being executed by processing circuitry 1570 and, utilized by network node 1560. Device readable medium 1580 may be used to store any calculations made by processing circuitry 1570 and/or any data received via interface 1590. In some embodiments, processing circuitry 1570 and device readable medium 1580 may be considered to be integrated.

Interface 1590 is used in the wired or wireless communication of signalling and/or data between network node 1560, network 1506, and/or WDs 1510. As illustrated, interface 1590 comprises port(s)/terminal(s) 1594 to send and receive data, for example to and from network 1506 over a wired connection. Interface 1590 also includes radio front end circuitry 1592 that may be coupled to, or in certain embodiments a part of, antenna 1562. Radio front end circuitry 1592 comprises filters 1598 and amplifiers 1596. Radio front end circuitry 1592 may be connected to antenna 1562 and processing circuitry 1570. Radio front end circuitry may be configured to condition signals communicated between antenna 1562 and processing circuitry 1570. Radio front end circuitry 1592 may receive digital data that is to be sent out to other network nodes or WDs via a wireless connection. Radio front end circuitry 1592 may convert the digital data into a radio signal having the appropriate channel and bandwidth parameters using a combination of filters 1598 and/or amplifiers 1596. The radio signal may then be transmitted via antenna 1562. Similarly, when receiving data, antenna 1562 may collect radio signals which are then converted into digital data by radio front end circuitry 1592. The digital data may be passed to processing circuitry 1570. In other embodiments, the interface may comprise different components and/or different combinations of components.

In certain alternative embodiments, network node 1560 may not include separate radio front end circuitry 1592, instead, processing circuitry 1570 may comprise radio front end circuitry and may be connected to antenna 1562 without separate radio front end circuitry 1592. Similarly, in some embodiments, all or some of RF transceiver circuitry 1572 may be considered a part of interface 1590. In still other embodiments, interface 1590 may include one or more ports or terminals 1594, radio front end circuitry 1592, and RF transceiver circuitry 1572, as part of a radio unit (not shown), and interface 1590 may communicate with baseband processing circuitry 1574, which is part of a digital unit (not shown).

Antenna 1562 may include one or more antennas, or antenna arrays, configured to send and/or receive wireless signals. Antenna 1562 may be coupled to radio front end circuitry 1590 and may be any type of antenna capable of transmitting and receiving data and/or signals wirelessly. In some embodiments, antenna 1562 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1562 may be separate from network node 1560 and may be connectable to network node 1560 through an interface or port.

Antenna 1562, interface 1590, and/or processing circuitry 1570 may be configured to perform any receiving operations and/or certain obtaining operations described herein as being performed by a network node. Any information, data and/or signals may be received from a wireless device, another network node and/or any other network equipment. Similarly, antenna 1562, interface 1590, and/or processing circuitry 1570 may be configured to perform any transmitting operations described herein as being performed by a network node. Any information, data and/or signals may be transmitted to a wireless device, another network node and/or any other network equipment.

Power circuitry 1587 may comprise, or be coupled to, power management circuitry and is configured to supply the components of network node 1560 with power for performing the functionality described herein. Power circuitry 1587 may receive power from power source 1586. Power source 1586 and/or power circuitry 1587 may be configured to provide power to the various components of network node 1560 in a form suitable for the respective components (e.g., at a voltage and current level needed for each respective component). Power source 1586 may either be included in, or external to, power circuitry 1587 and/or network node 1560. For example, network node 1560 may be connectable to an external power source (e.g., an electricity outlet) via an input circuitry or interface such as an electrical cable, whereby the external power source supplies power to power circuitry 1587. As a further example, power source 1586 may comprise a source of power in the form of a battery or battery pack which is connected to, or integrated in, power circuitry 1587. The battery may provide backup power should the external power source fail. Other types of power sources, such as photovoltaic devices, may also be used.

Alternative embodiments of network node 1560 may include additional components beyond those shown in FIG. 15 that may be responsible for providing certain aspects of the network node's functionality, including any of the functionality described herein and/or any functionality necessary to support the subject matter described herein. For example, network node 1560 may include user interface equipment to allow input of information into network node 1560 and to allow output of information from network node 1560. This may allow a user to perform diagnostic, maintenance, repair, and other administrative functions for network node 1560.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1510 includes antenna 1511, interface 1514, processing circuitry 1520, device readable medium 1530, user interface equipment 1532, auxiliary equipment 1534, power source 1536 and power circuitry 1537. WD 1510 may include multiple sets of one or more of the illustrated components for different wireless technologies supported by WD 1510, such as, for example, GSM, WCDMA, LTE, NR, WiFi, WiMAX, NB-IoT, or Bluetooth wireless technologies, just to mention a few. These wireless technologies may be integrated into the same or different chips or set of chips as other components within WD 1510.

Antenna 1511 may include one or more antennas or antenna arrays, configured to send and/or receive wireless signals, and is connected to interface 1514. In certain alternative embodiments, antenna 1511 may be separate from WD 1510 and be connectable to WD 1510 through an interface or port. Antenna 1511, interface 1514, and/or processing circuitry 1520 may be configured to perform any receiving or transmitting operations described herein as being performed by a WD. Any information, data and/or signals may be received from a network node and/or another WD. In some embodiments, radio front end circuitry and/or antenna 1511 may be considered an interface.

As illustrated, interface 1514 comprises radio front end circuitry 1512 and antenna 1511. Radio front end circuitry 1512 comprise one or more filters 1518 and amplifiers 1516. Radio front end circuitry 1514 is connected to antenna 1511 and processing circuitry 1520, and is configured to condition signals communicated between antenna 1511 and processing circuitry 1520. Radio front end circuitry 1512 may be coupled to or a part of antenna 1511. In some embodiments, WD 1510 may not include separate radio front end circuitry 1512; rather, processing circuitry 1520 may comprise radio front end circuitry and may be connected to antenna 1511. Similarly, in some embodiments, some or all of RF transceiver circuitry 1522 may be considered a part of interface 1514. Radio front end circuitry 1512 may receive digital data that is to be sent out to other network nodes or WDs via a wireless connection. Radio front end circuitry 1512 may convert the digital data into a radio signal having the appropriate channel and bandwidth parameters using a combination of filters 1518 and/or amplifiers 1516. The radio signal may then be transmitted via antenna 1511. Similarly, when receiving data, antenna 1511 may collect radio signals which are then converted into digital data by radio front end circuitry 1512. The digital data may be passed to processing circuitry 1520. In other embodiments, the interface may comprise different components and/or different combinations of components.

Processing circuitry 1520 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1510 components, such as device readable medium 1530, WD 1510 functionality. Such functionality may include providing any of the various wireless features or benefits discussed herein. For example, processing circuitry 1520 may execute instructions stored in device readable medium 1530 or in memory within processing circuitry 1520 to provide the functionality disclosed herein.

As illustrated, processing circuitry 1520 includes one or more of RF transceiver circuitry 1522, baseband processing circuitry 1524, and application processing circuitry 1526. In other embodiments, the processing circuitry may comprise different components and/or different combinations of components. In certain embodiments processing circuitry 1520 of WD 1510 may comprise a SOC. In some embodiments, RF transceiver circuitry 1522, baseband processing circuitry 1524, and application processing circuitry 1526 may be on separate chips or sets of chips. In alternative embodiments, part or all of baseband processing circuitry 1524 and application processing circuitry 1526 may be combined into one chip or set of chips, and RF transceiver circuitry 1522 may be on a separate chip or set of chips. In still alternative embodiments, part or all of RF transceiver circuitry 1522 and baseband processing circuitry 1524 may be on the same chip or set of chips, and application processing circuitry 1526 may be on a separate chip or set of chips. In yet other alternative embodiments, part or all of RF transceiver circuitry 1522, baseband processing circuitry 1524, and application processing circuitry 1526 may be combined in the same chip or set of chips. In some embodiments, RF transceiver circuitry 1522 may be a part of interface 1514. RF transceiver circuitry 1522 may condition RF signals for processing circuitry 1520.

In certain embodiments, some or all of the functionality described herein as being performed by a WD may be provided by processing circuitry 1520 executing instructions stored on device readable medium 1530, which in certain embodiments may be a computer-readable storage medium. In alternative embodiments, some or all of the functionality may be provided by processing circuitry 1520 without executing instructions stored on a separate or discrete device readable storage medium, such as in a hard-wired manner. In any of those particular embodiments, whether executing instructions stored on a device readable storage medium or not, processing circuitry 1520 can be configured to perform the described functionality. The benefits provided by such functionality are not limited to processing circuitry 1520 alone or to other components of WD 1510, but are enjoyed by WD 1510 as a whole, and/or by end users and the wireless network generally.

Processing circuitry 1520 may be configured to perform any determining, calculating, or similar operations (e.g., certain obtaining operations) described herein as being performed by a WD. These operations, as performed by processing circuitry 1520, may include processing information obtained by processing circuitry 1520 by, for example, converting the obtained information into other information, comparing the obtained information or converted information to information stored by WD 1510, and/or performing one or more operations based on the obtained information or converted information, and as a result of said processing making a determination.

Device readable medium 1530 may be operable to store a computer program, software, an application including one or more of logic, rules, code, tables, etc. and/or other instructions capable of being executed by processing circuitry 1520. Device readable medium 1530 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1520. In some embodiments, processing circuitry 1520 and device readable medium 1530 may be considered to be integrated.

User interface equipment 1532 may provide components that allow for a human user to interact with WD 1510. Such interaction may be of many forms, such as visual, audial, tactile, etc. User interface equipment 1532 may be operable to produce output to the user and to allow the user to provide input to WD 1510. The type of interaction may vary depending on the type of user interface equipment 1532 installed in WD 1510. For example, if WD 1510 is a smart phone, the interaction may be via a touch screen; if WD 1510 is a smart meter, the interaction may be through a screen that provides usage (e.g., the number of gallons used) or a speaker that provides an audible alert (e.g., if smoke is detected). User interface equipment 1532 may include input interfaces, devices and circuits, and output interfaces, devices and circuits. User interface equipment 1532 is configured to allow input of information into WD 1510, and is connected to processing circuitry 1520 to allow processing circuitry 1520 to process the input information. User interface equipment 1532 may include, for example, a microphone, a proximity or other sensor, keys/buttons, a touch display, one or more cameras, a USB port, or other input circuitry. User interface equipment 1532 is also configured to allow output of information from WD 1510, and to allow processing circuitry 1520 to output information from WD 1510. User interface equipment 1532 may include, for example, a speaker, a display, vibrating circuitry, a USB port, a headphone interface, or other output circuitry. Using one or more input and output interfaces, devices, and circuits, of user interface equipment 1532, WD 1510 may communicate with end users and/or the wireless network, and allow them to benefit from the functionality described herein.

Auxiliary equipment 1534 is operable to provide more specific functionality which may not be generally performed by WDs. This may comprise specialized sensors for doing measurements for various purposes, interfaces for additional types of communication such as wired communications etc. The inclusion and type of components of auxiliary equipment 1534 may vary depending on the embodiment and/or scenario.

Power source 1536 may, in some embodiments, be in the form of a battery or battery pack. Other types of power sources, such as an external power source (e.g., an electricity outlet), photovoltaic devices or power cells, may also be used. WD 1510 may further comprise power circuitry 1537 for delivering power from power source 1536 to the various parts of WD 1510 which need power from power source 1536 to carry out any functionality described or indicated herein. Power circuitry 1537 may in certain embodiments comprise power management circuitry. Power circuitry 1537 may additionally or alternatively be operable to receive power from an external power source; in which case WD 1510 may be connectable to the external power source (such as an electricity outlet) via input circuitry or an interface such as an electrical power cable. Power circuitry 1537 may also in certain embodiments be operable to deliver power from an external power source to power source 1536. This may be, for example, for the charging of power source 1536. Power circuitry 1537 may perform any formatting, converting, or other modification to the power from power source 1536 to make the power suitable for the respective components of WD 1510 to which power is supplied.

Figure 16:
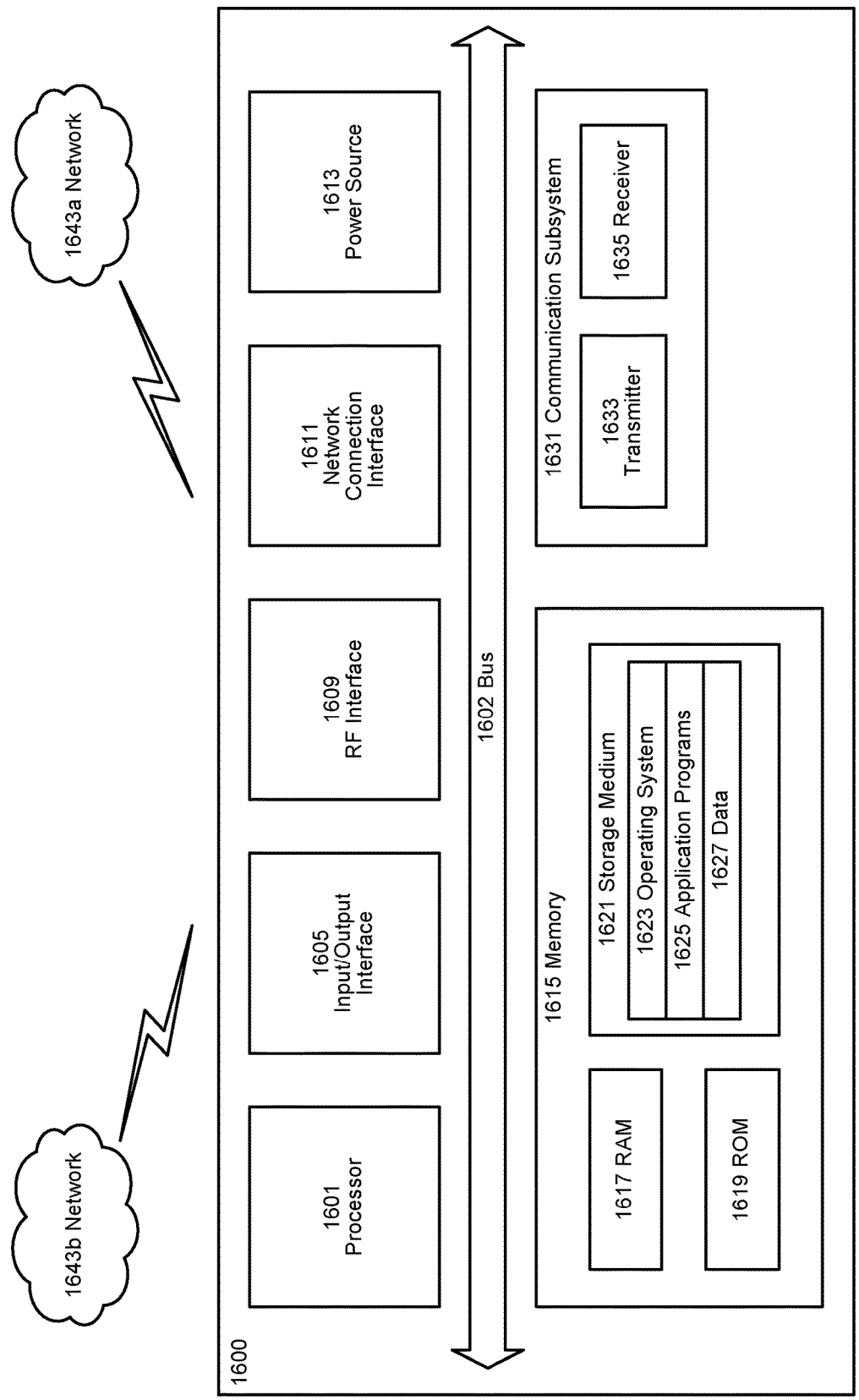
FIG. 16 is a block diagram of a user equipment according to some embodiments.

FIG. 16 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 16200 may be any UE identified by the $3^{rd}$ Generation Partnership Project (3GPP), including a NB-IoT UE, a machine type communication (MTC) UE, and/or an enhanced MTC (eMTC) UE. UE 1600, as illustrated in FIG. 16, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 16 is a UE, the components discussed herein are equally applicable to a WD, and vice-versa.

In FIG. 16, UE 1600 includes processing circuitry 1601 that is operatively coupled to input/output interface 1605, radio frequency (RF) interface 1609, network connection interface 1611, memory 1615 including random access memory (RAM) 1617, read-only memory (ROM) 1619, and storage medium 1621 or the like, communication subsystem 1631, power source 1633, and/or any other component, or any combination thereof. Storage medium 1621 includes operating system 1623, application program 1625, and data 1627. In other embodiments, storage medium 1621 may include other similar types of information. Certain UEs may utilize all of the components shown in FIG. 16, or only a subset of the components. The level of integration between the components may vary from one UE to another UE. Further, certain UEs may contain multiple instances of a component, such as multiple processors, memories, transceivers, transmitters, receivers, etc.

In FIG. 16, processing circuitry 1601 may be configured to process computer instructions and data. Processing circuitry 1601 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1601 may include two central processing units (CPUs). Data may be information in a form suitable for use by a computer.

In the depicted embodiment, input/output interface 1605 may be configured to provide a communication interface to an input device, output device, or input and output device. UE 1600 may be configured to use an output device via input/output interface 1605. An output device may use the same type of interface port as an input device. For example, a USB port may be used to provide input to and output from UE 1600. The output device may be a speaker, a sound card, a video card, a display, a monitor, a printer, an actuator, an emitter, a smartcard, another output device, or any combination thereof. UE 1600 may be configured to use an input device via input/output interface 1605 to allow a user to capture information into UE 1600. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 16, RF interface 1609 may be configured to provide a communication interface to RF components such as a transmitter, a receiver, and an antenna. Network connection interface 1611 may be configured to provide a communication interface to network 1643a. Network 1643a may encompass wired and/or wireless networks such as a local-area network (LAN), a wide-area network (WAN), a computer network, a wireless network, a telecommunications network, another like network or any combination thereof. For example, network 1643*a* may comprise a Wi-Fi network. Network connection interface 1611 may be configured to include a receiver and a transmitter interface used to communicate with one or more other devices over a communication network according to one or more communication protocols, such as Ethernet, TCP/IP, SONET, ATM, or the like. Network connection interface 1611 may implement receiver and transmitter functionality appropriate to the communication network links (e.g., optical, electrical, and the like). The transmitter and receiver functions may share circuit components, software or firmware, or alternatively may be implemented separately.

RAM 1617 may be configured to interface via bus 1602 to processing circuitry 1601 to provide storage or caching of data or computer instructions during the execution of software programs such as the operating system, application programs, and device drivers. ROM 1619 may be configured to provide computer instructions or data to processing circuitry 1601. For example, ROM 1619 may be configured to store invariant low-level system code or data for basic system functions such as basic input and output (I/O), startup, or reception of keystrokes from a keyboard that are stored in a non-volatile memory. Storage medium 1621 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1621 may be configured to include operating system 1623, application program 1625 such as a web browser application, a widget or gadget engine or another application, and data file 1627. Storage medium 1621 may store, for use by UE 1600, any of a variety of various operating systems or combinations of operating systems.

Storage medium 1621 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1621 may allow UE 1600 to access computer-executable instructions, application programs or the like, stored on transitory or non-transitory memory media, to off-load data, or to upload data. An article of manufacture, such as one utilizing a communication system may be tangibly embodied in storage medium 1621, which may comprise a device readable medium.

In FIG. 16, processing circuitry 1601 may be configured to communicate with network 1643*b* using communication subsystem 1631. Network 1643*a* and network 1643*b* may be the same network or networks or different network or networks. Communication subsystem 1631 may be configured to include one or more transceivers used to communicate with network 1643*b*. For example, communication subsystem 1631 may be configured to include one or more transceivers used to communicate with one or more remote transceivers of another device capable of wireless communication such as another WD, UE, or base station of a radio access network (RAN) according to one or more communication protocols, such as IEEE 802.16, CDMA, WCDMA, GSM, LTE, UTRAN, WiMax, or the like. Each transceiver may include transmitter 1633 and/or receiver 1635 to implement transmitter or receiver functionality, respectively, appropriate to the RAN links (e.g., frequency allocations and the like). Further, transmitter 1633 and receiver 1635 of each transceiver may share circuit components, software or firmware, or alternatively may be implemented separately.

In the illustrated embodiment, the communication functions of communication subsystem 1631 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1631 may include cellular communication, Wi-Fi communication, Bluetooth communication, and GPS communication. Network 1643*b* may encompass wired and/or wireless networks such as a local-area network (LAN), a wide-area network (WAN), a computer network, a wireless network, a telecommunications network, another like network or any combination thereof. For example, network 1643*b* may be a cellular network, a Wi-Fi network, and/or a near-field network. Power source 1613 may be configured to provide alternating current (AC) or direct current (DC) power to components of UE 1600.

The features, benefits and/or functions described herein may be implemented in one of the components of UE 1600 or partitioned across multiple components of UE 1600. Further, the features, benefits, and/or functions described herein may be implemented in any combination of hardware, software or firmware. In one example, communication subsystem 1631 may be configured to include any of the components described herein. Further, processing circuitry 1601 may be configured to communicate with any of such components over bus 1602. In another example, any of such components may be represented by program instructions stored in memory that when executed by processing circuitry 1601 perform the corresponding functions described herein. In another example, the functionality of any of such components may be partitioned between processing circuitry 1601 and communication subsystem 1631. In another example, the non-computationally intensive functions of any of such components may be implemented in software or firmware and the computationally intensive functions may be implemented in hardware.

Figure 17:
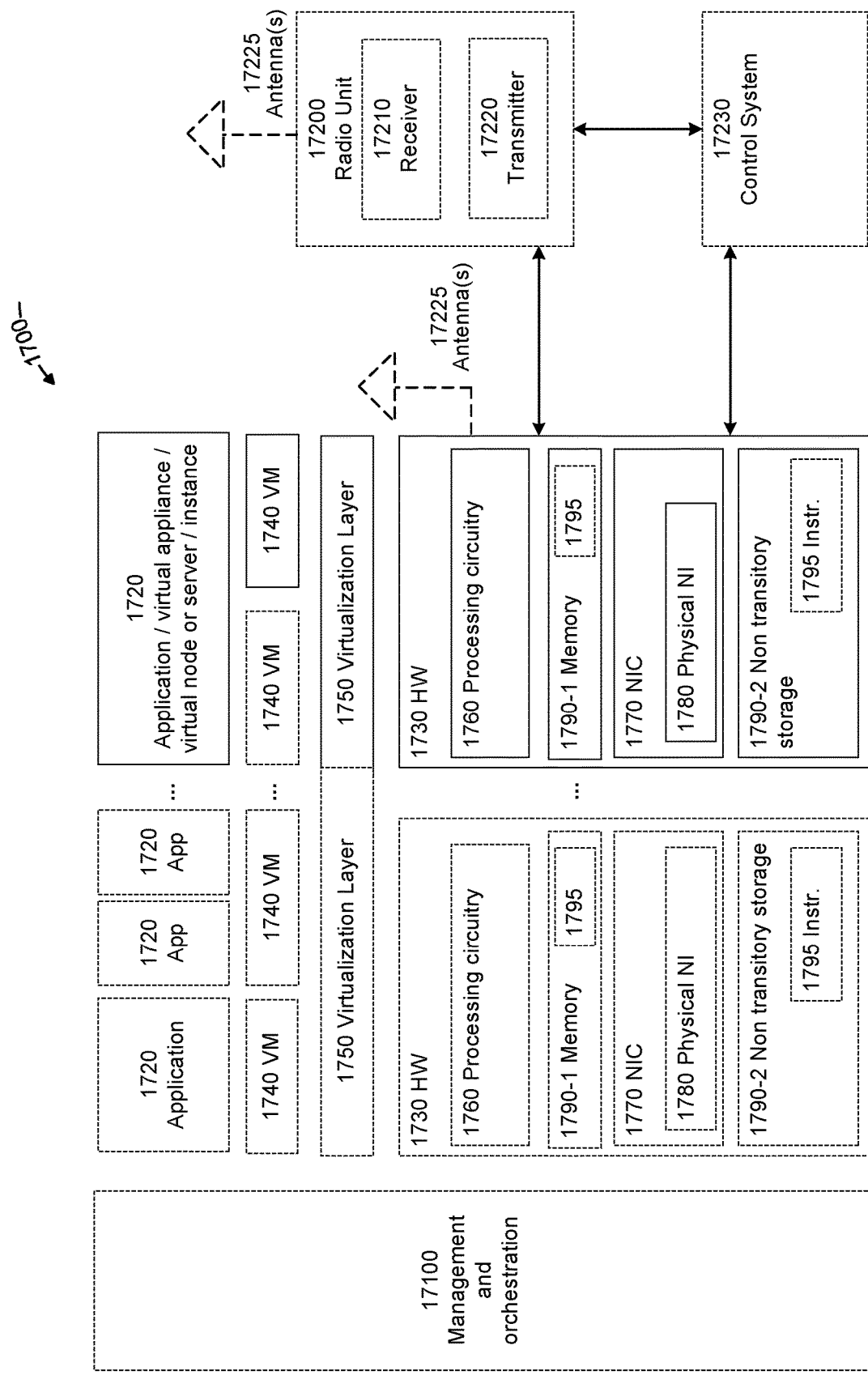
FIG. 17 is a block diagram of a virtualization environment according to some embodiments.

FIG. 17 is a schematic block diagram illustrating a virtualization environment 1700 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1700 hosted by one or more of hardware nodes 1730. Further, in embodiments in which the virtual node is not a radio access node or does not require radio connectivity (e.g., a core network node), then the network node may be entirely virtualized.

The functions may be implemented by one or more applications 1720 (which may alternatively be called software instances, virtual appliances, network functions, virtual nodes, virtual network functions, etc.) operative to implement some of the features, functions, and/or benefits of some of the embodiments disclosed herein. Applications 1720 are run in virtualization environment 1700 which provides hardware 1730 comprising processing circuitry 1760 and memory 1790. Memory 1790 contains instructions 1795 executable by processing circuitry 1760 whereby application 1720 is operative to provide one or more of the features, benefits, and/or functions disclosed herein.

Virtualization environment 1700, comprises general-purpose or special-purpose network hardware devices 1730 comprising a set of one or more processors or processing circuitry 1760, which may be commercial off-the-shelf (COTS) processors, dedicated Application Specific Integrated Circuits (ASICs), or any other type of processing circuitry including digital or analog hardware components or special purpose processors. Each hardware device may comprise memory 1790-1 which may be non-persistent memory for temporarily storing instructions 1795 or software executed by processing circuitry 1760. Each hardware device may comprise one or more network interface controllers (NICs) 1770, also known as network interface cards, which include physical network interface 1780. Each hardware device may also include non-transitory, persistent, machine-readable storage media 1790-2 having stored therein software 1795 and/or instructions executable by processing circuitry 1760. Software 1795 may include any type of software including software for instantiating one or more virtualization layers 1750 (also referred to as hypervisors), software to execute virtual machines 1740 as well as software allowing it to execute functions, features and/or benefits described in relation with some embodiments described herein.

Virtual machines 1740, comprise virtual processing, virtual memory, virtual networking or interface and virtual storage, and may be run by a corresponding virtualization layer 1750 or hypervisor. Different embodiments of the instance of virtual appliance 1720 may be implemented on one or more of virtual machines 1740, and the implementations may be made in different ways.

During operation, processing circuitry 1760 executes software 1795 to instantiate the hypervisor or virtualization layer 1750, which may sometimes be referred to as a virtual machine monitor (VMM). Virtualization layer 1750 may present a virtual operating platform that appears like networking hardware to virtual machine 1740.

As shown in FIG. 17, hardware 1730 may be a standalone network node with generic or specific components. Hardware 1730 may comprise antenna 17225 and may implement some functions via virtualization. Alternatively, hardware 1730 may be part of a larger cluster of hardware (e.g. such as in a data center or customer premise equipment (CPE)) where many hardware nodes work together and are managed via management and orchestration (MANO) 17100, which, among others, oversees lifecycle management of applications 1720.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1740 may be a software implementation of a physical machine that runs programs as if they were executing on a physical, non-virtualized machine. Each of virtual machines 1740, and that part of hardware 1730 that executes that virtual machine, be it hardware dedicated to that virtual machine and/or hardware shared by that virtual machine with others of the virtual machines 1740, forms a separate virtual network elements (VNE).

Still in the context of NFV, Virtual Network Function (VNF) is responsible for handling specific network functions that run in one or more virtual machines 1740 on top of hardware networking infrastructure 1730 and corresponds to application 1720 in FIG. 17.

In some embodiments, one or more radio units 17200 that each include one or more transmitters 17220 and one or more receivers 17210 may be coupled to one or more antennas 17225. Radio units 17200 may communicate directly with hardware nodes 1730 via one or more appropriate network interfaces and may be used in combination with the virtual components to provide a virtual node with radio capabilities, such as a radio access node or a base station.

In some embodiments, some signalling can be effected with the use of control system 17230 which may alternatively be used for communication between the hardware nodes 1730 and radio units 17200.

Figure 18:
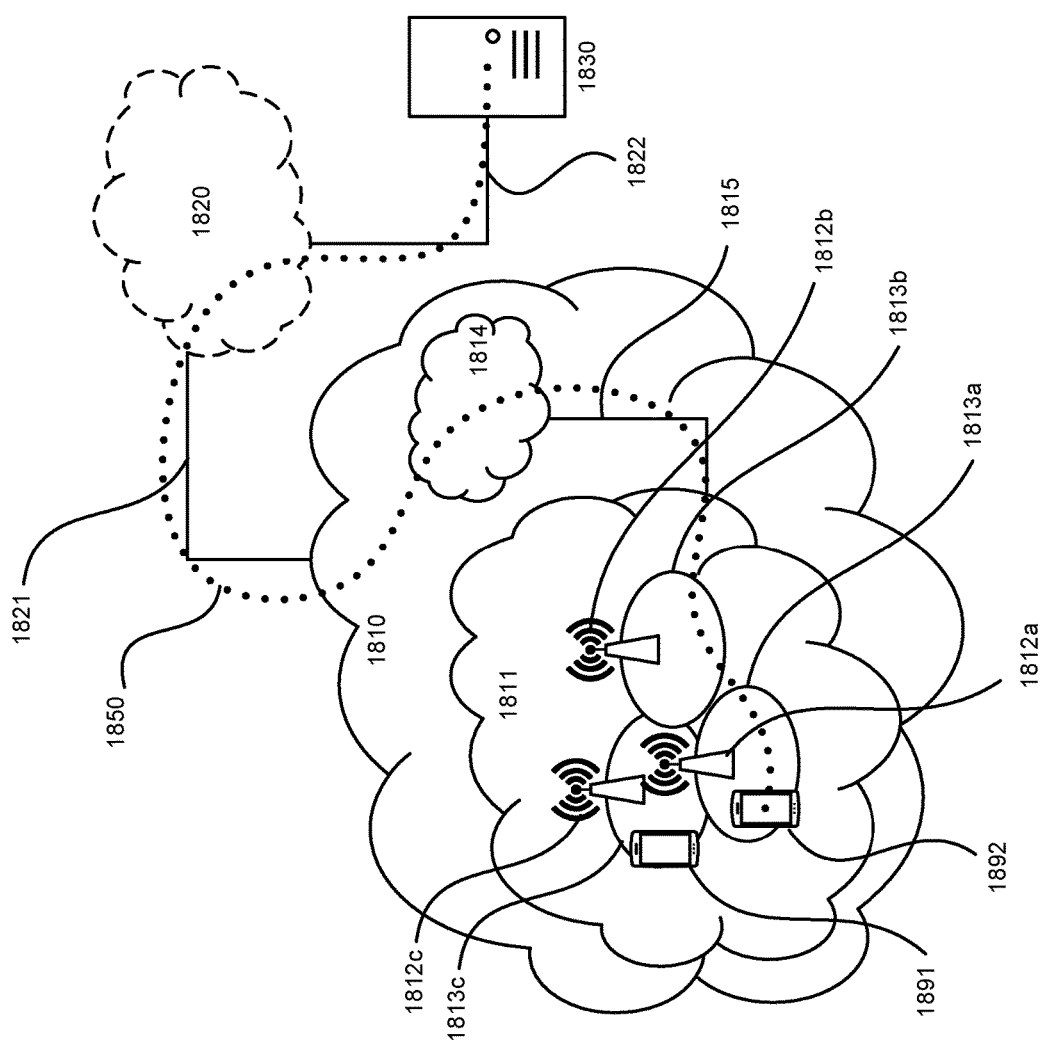
FIG. 18 is a block diagram of a communication network with a host computer according to some embodiments.

FIG. 18 illustrates a telecommunication network connected via an intermediate network to a host computer in accordance with some embodiments. In particular, with reference to FIG. 18, in accordance with an embodiment, a communication system includes telecommunication network 1810, such as a 3GPP-type cellular network, which comprises access network 1811, such as a radio access network, and core network 1814. Access network 1811 comprises a plurality of base stations 1812*a*, 1812*b*, 1812*c*, such as NBs, eNBs, gNBs or other types of wireless access points, each defining a corresponding coverage area 1813*a*, 1813*b*, 1813*c*. Each base station 1812*a*, 1812*b*, 1812*c* is connectable to core network 1814 over a wired or wireless connection 1815. A first UE 1891 located in coverage area 1813*c* is configured to wirelessly connect to, or be paged by, the corresponding base station 1812*c*. A second UE 1892 in coverage area 1813*a* is wirelessly connectable to the corresponding base station 1812*a*. While a plurality of UEs 1891, 1892 are illustrated in this example, the disclosed embodiments are equally applicable to a situation where a sole UE is in the coverage area or where a sole UE is connecting to the corresponding base station 1812.

Telecommunication network 1810 is itself connected to host computer 1830, which may be embodied in the hardware and/or software of a standalone server, a cloud-implemented server, a distributed server or as processing resources in a server farm. Host computer 1830 may be under the ownership or control of a service provider, or may be operated by the service provider or on behalf of the service provider. Connections 1821 and 1822 between telecommunication network 1810 and host computer 1830 may extend directly from core network 1814 to host computer 1830 or may go via an optional intermediate network 1820. Intermediate network 1820 may be one of, or a combination of more than one of, a public, private or hosted network; intermediate network 1820, if any, may be a backbone network or the Internet; in particular, intermediate network 1820 may comprise two or more sub-networks (not shown).

The communication system of FIG. 18 as a whole enables connectivity between the connected UEs 1891, 1892 and host computer 1830. The connectivity may be described as an over-the-top (OTT) connection 1850. Host computer 1830 and the connected UEs 1891, 1892 are configured to communicate data and/or signaling via OTT connection 1850, using access network 1811, core network 1814, any intermediate network 1820 and possible further infrastructure (not shown) as intermediaries. OTT connection 1850 may be transparent in the sense that the participating communication devices through which OTT connection 1850 passes are unaware of routing of uplink and downlink communications. For example, base station 1812 may not or need not be informed about the past routing of an incoming downlink communication with data originating from host computer 1830 to be forwarded (e.g., handed over) to a connected UE 1891. Similarly, base station 1812 need not be aware of the future routing of an outgoing uplink communication originating from the UE 1891 towards the host computer 1830.

Figure 19:
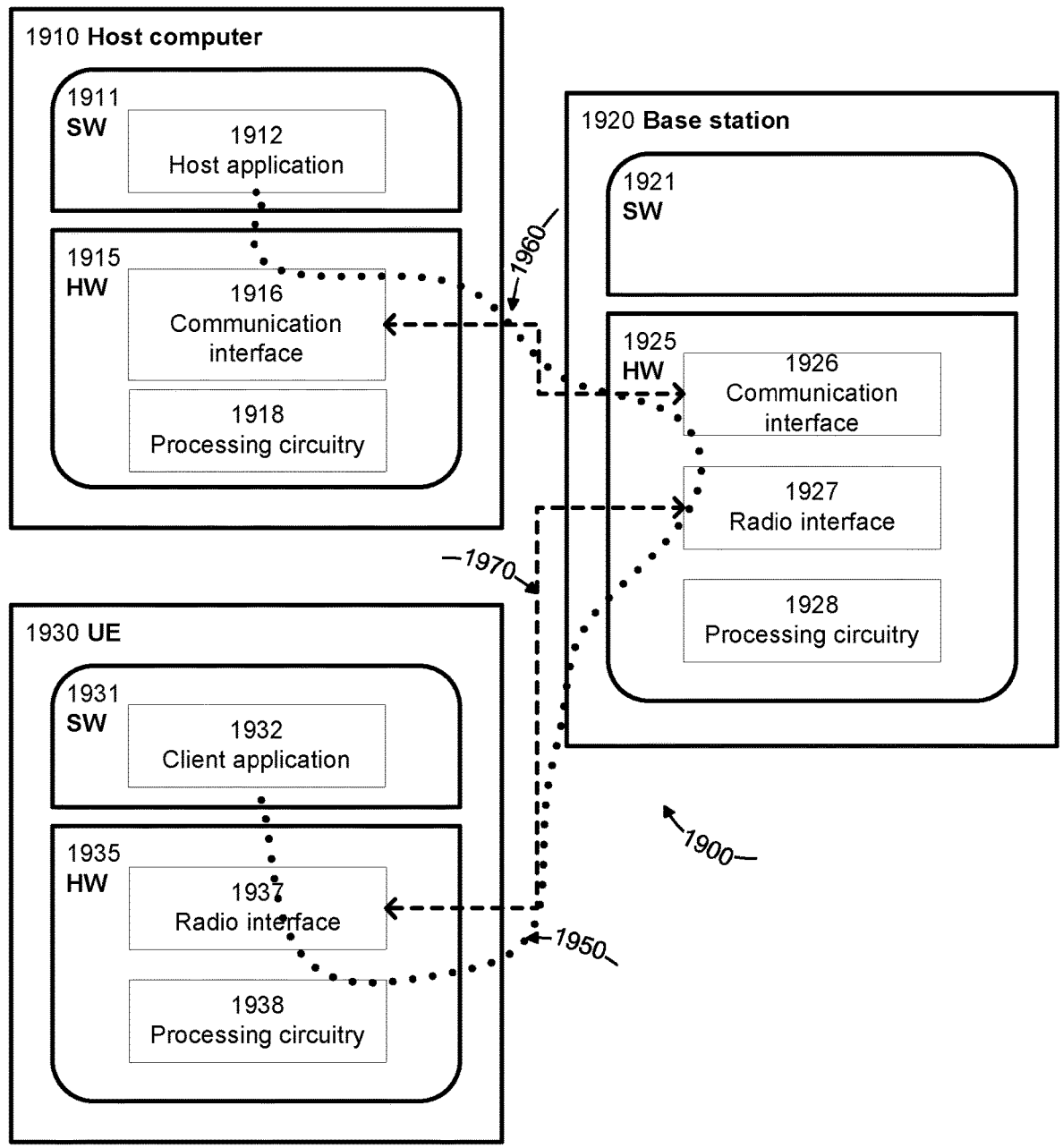
FIG. 19 is a block diagram of a host computer according to some embodiments.

Example implementations, in accordance with an embodiment, of the UE, base station and host computer discussed in the preceding paragraphs will now be described with reference to FIG. 19. FIG. 19 illustrates host computer communicating via a base station with a user equipment over a partially wireless connection in accordance with some embodiments In communication system 1900, host computer 1910 comprises hardware 1915 including communication interface 1916 configured to set up and maintain a wired or wireless connection with an interface of a different communication device of communication system 1900. Host computer 1910 further comprises processing circuitry 1918, which may have storage and/or processing capabilities. In particular, processing circuitry 1918 may comprise one or more programmable processors, application-specific integrated circuits, field programmable gate arrays or combinations of these (not shown) adapted to execute instructions. Host computer 1910 further comprises software 1911, which is stored in or accessible by host computer 1910 and executable by processing circuitry 1918. Software 1911 includes host application 1912. Host application 1912 may be operable to provide a service to a remote user, such as UE 1930 connecting via OTT connection 1950 terminating at UE 1930 and host computer 1910. In providing the service to the remote user, host application 1912 may provide user data which is transmitted using OTT connection 1950.

Communication system 1900 further includes base station 1920 provided in a telecommunication system and comprising hardware 1925 enabling it to communicate with host computer 1910 and with UE 1930. Hardware 1925 may include communication interface 1926 for setting up and maintaining a wired or wireless connection with an interface of a different communication device of communication system 1900, as well as radio interface 1927 for setting up and maintaining at least wireless connection 1970 with UE 1930 located in a coverage area (not shown in FIG. 19) served by base station 1920. Communication interface 1926 may be configured to facilitate connection 1960 to host computer 1910. Connection 1960 may be direct or it may pass through a core network (not shown in FIG. 19) of the telecommunication system and/or through one or more intermediate networks outside the telecommunication system. In the embodiment shown, hardware 1925 of base station 1920 further includes processing circuitry 1928, which may comprise one or more programmable processors, application-specific integrated circuits, field programmable gate arrays or combinations of these (not shown) adapted to execute instructions. Base station 1920 further has software 1921 stored internally or accessible via an external connection.

Communication system 1900 further includes UE 1930 already referred to. Its hardware 1935 may include radio interface 1937 configured to set up and maintain wireless connection 1970 with a base station serving a coverage area in which UE 1930 is currently located. Hardware 1935 of UE 1930 further includes processing circuitry 1938, which may comprise one or more programmable processors, application-specific integrated circuits, field programmable gate arrays or combinations of these (not shown) adapted to execute instructions. UE 1930 further comprises software 1931, which is stored in or accessible by UE 1930 and executable by processing circuitry 1938. Software 1931 includes client application 1932. Client application 1932 may be operable to provide a service to a human or non-human user via UE 1930, with the support of host computer 1910. In host computer 1910, an executing host application 1912 may communicate with the executing client application 1932 via OTT connection 1950 terminating at UE 1930 and host computer 1910. In providing the service to the user, client application 1932 may receive request data from host application 1912 and provide user data in response to the request data. OTT connection 1950 may transfer both the request data and the user data. Client application 1932 may interact with the user to generate the user data that it provides.

It is noted that host computer 1910, base station 1920 and UE 1930 illustrated in FIG. 19 may be similar or identical to host computer 1830, one of base stations 1812a, 1812b, 1812c and one of UEs 1891, 1892 of FIG. 18, respectively. This is to say, the inner workings of these entities may be as shown in FIG. 19 and independently, the surrounding network topology may be that of FIG. 18.

In FIG. 19, OTT connection 1950 has been drawn abstractly to illustrate the communication between host computer 1910 and UE 1930 via base station 1920, without explicit reference to any intermediary devices and the precise routing of messages via these devices. Network infrastructure may determine the routing, which it may be configured to hide from UE 1930 or from the service provider operating host computer 1910, or both. While OTT connection 1950 is active, the network infrastructure may further take decisions by which it dynamically changes the routing (e.g., on the basis of load balancing consideration or reconfiguration of the network).

Wireless connection 1970 between UE 1930 and base station 1920 is in accordance with the teachings of the embodiments described throughout this disclosure. One or more of the various embodiments improve the performance of OTT services provided to UE 1930 using OTT connection 1950, in which wireless connection 1970 forms the last segment. More precisely, the teachings of these embodiments may improve the power consumption of a wireless device thereby provide benefits such as extended battery lifetime.

A measurement procedure may be provided for the purpose of monitoring data rate, latency and other factors on which the one or more embodiments improve. There may further be an optional network functionality for reconfiguring OTT connection 1950 between host computer 1910 and UE 1930, in response to variations in the measurement results. The measurement procedure and/or the network functionality for reconfiguring OTT connection 1950 may be implemented in software 1911 and hardware 1915 of host computer 1910 or in software 1931 and hardware 1935 of UE 1930, or both. In embodiments, sensors (not shown) may be deployed in or in association with communication devices through which OTT connection 1950 passes; the sensors may participate in the measurement procedure by supplying values of the monitored quantities exemplified above, or supplying values of other physical quantities from which software 1911, 1931 may compute or estimate the monitored quantities. The reconfiguring of OTT connection 1950 may include message format, retransmission settings, preferred routing etc.; the reconfiguring need not affect base station 1920, and it may be unknown or imperceptible to base station 1920. Such procedures and functionalities may be known and practiced in the art. In certain embodiments, measurements may involve proprietary UE signaling facilitating host computer 1910's measurements of throughput, propagation times, latency and the like. The measurements may be implemented in that software 1911 and 1931 causes messages to be transmitted, in particular empty or 'dummy' messages, using OTT connection 1950 while it monitors propagation times, errors etc.

Figure 20:
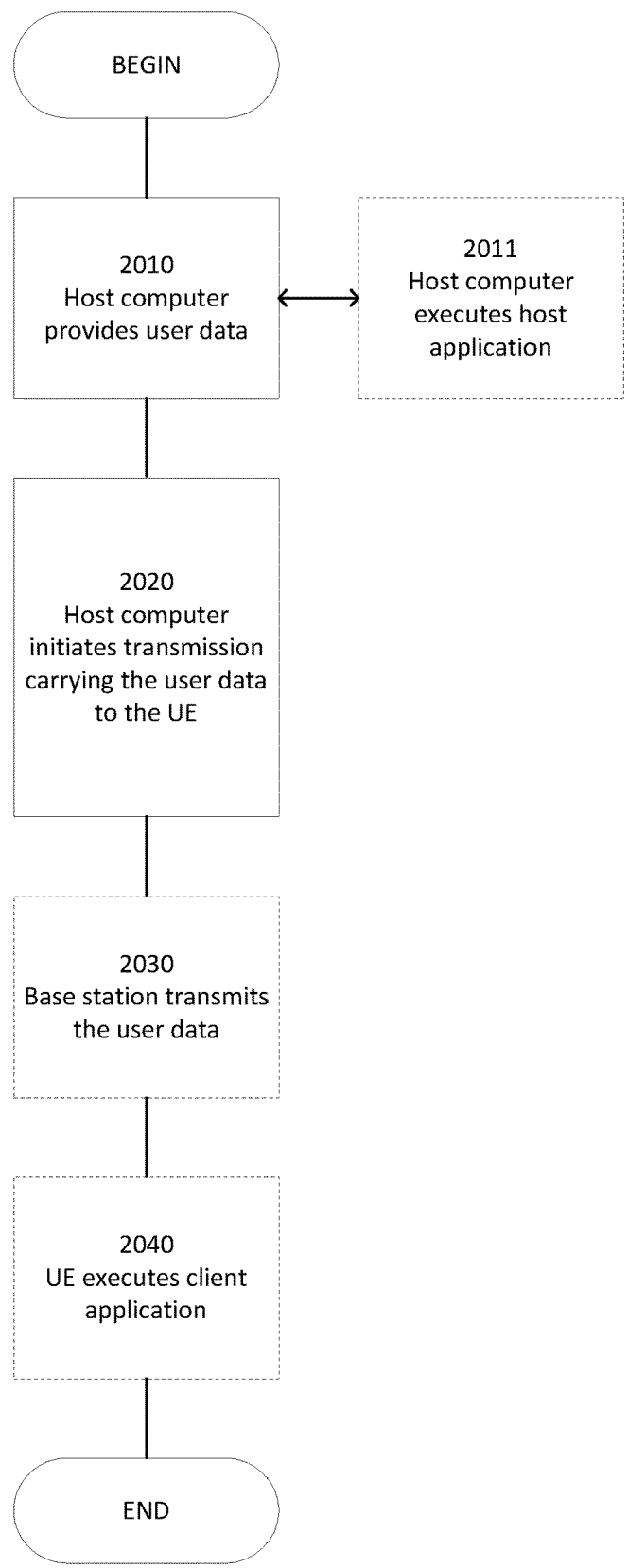
FIG. 20 is a flowchart illustrating a method implemented in a communication system, in accordance with one embodiment.

FIG. 20 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 20 will be included in this section. In step 2010, the host computer provides user data. In substep 2011 (which may be optional) of step 2010, the host computer provides the user data by executing a host application. In step 2020, the host computer initiates a transmission carrying the user data to the UE. In step 2030 (which may be optional), the base station transmits to the UE the user data which was carried in the transmission that the host computer initiated, in accordance with the teachings of the embodiments described throughout this disclosure. In step 2040 (which may also be optional), the UE executes a client application associated with the host application executed by the host computer.

Figure 21:
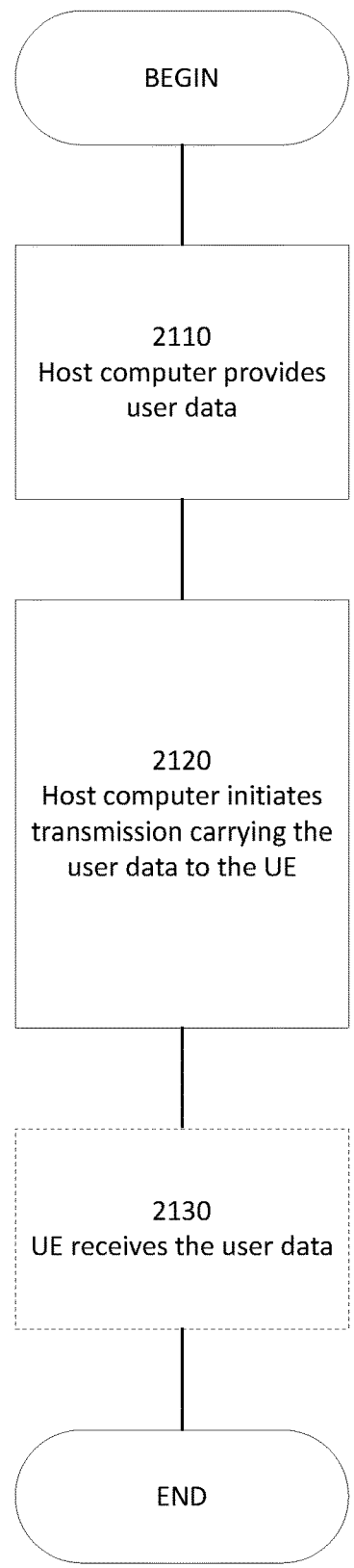
FIG. 21 is a flowchart illustrating a method implemented in a communication system, in accordance with one embodiment.

FIG. 21 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 21 will be included in this section. In step 2110 of the method, the host computer provides user data. In an optional substep (not shown) the host computer provides the user data by executing a host application. In step 2120, the host computer initiates a transmission carrying the user data to the UE. The transmission may pass via the base station, in accordance with the teachings of the embodiments described throughout this disclosure. In step 2130 (which may be optional), the UE receives the user data carried in the transmission.

Figure 22:
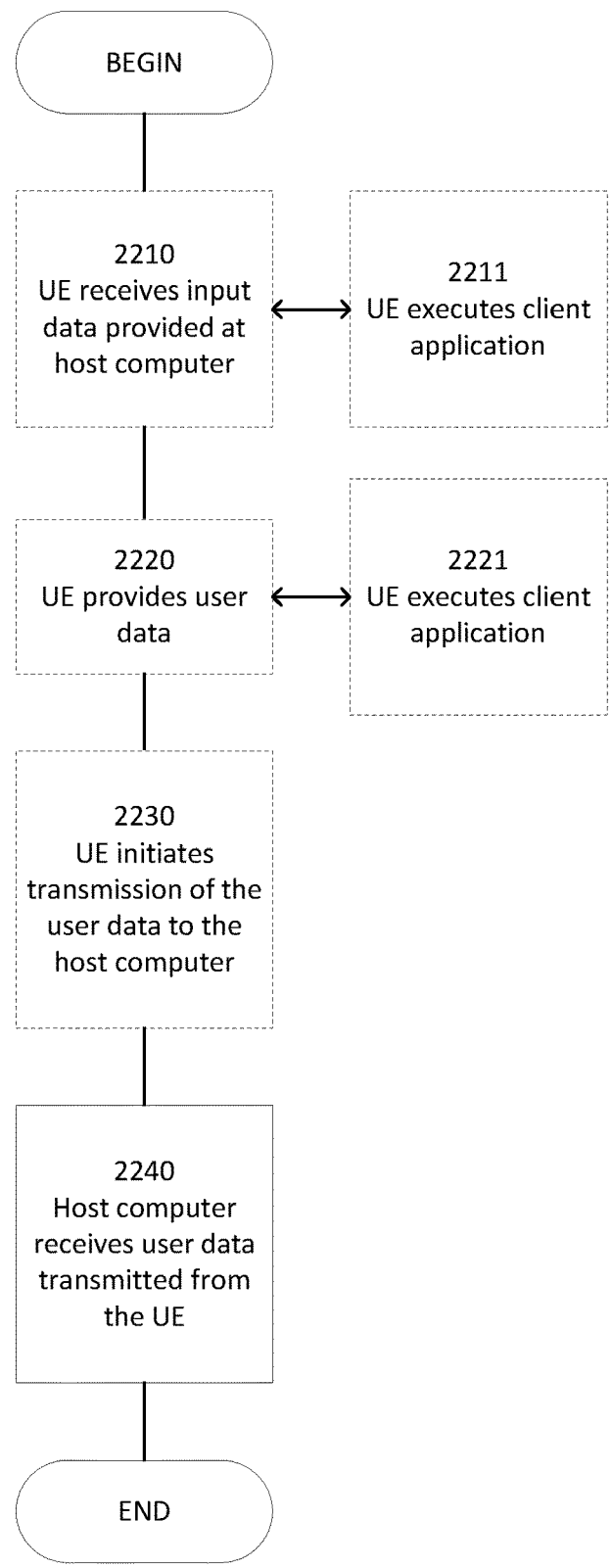
FIG. 22 is a flowchart illustrating a method implemented in a communication system, in accordance with one embodiment.

FIG. 22 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 22 will be included in this section. In step 2210 (which may be optional), the UE receives input data provided by the host computer. Additionally or alternatively, in step 2220, the UE provides user data. In substep 2221 (which may be optional) of step 2220, the UE provides the user data by executing a client application. In substep 2211 (which may be optional) of step 2210, the UE executes a client application which provides the user data in reaction to the received input data provided by the host computer. In providing the user data, the executed client application may further consider user input received from the user. Regardless of the specific manner in which the user data was provided, the UE initiates, in substep 2230 (which may be optional), transmission of the user data to the host computer. In step 2240 of the method, the host computer receives the user data transmitted from the UE, in accordance with the teachings of the embodiments described throughout this disclosure.

Figure 23:
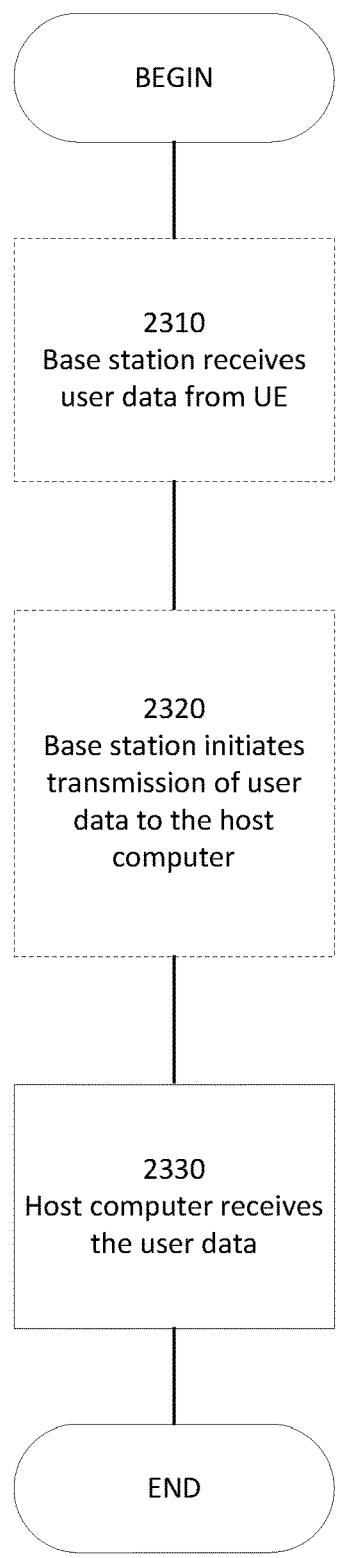
FIG. 23 is a flowchart illustrating a method implemented in a communication system, in accordance with one embodiment.

FIG. 23 is a flowchart illustrating a method implemented in a communication system, in accordance with one embodiment. The communication system includes a host computer, a base station and a UE which may be those described with reference to FIGS. 18 and 19. For simplicity of the present disclosure, only drawing references to FIG. 23 will be included in this section. In step 2310 (which may be optional), in accordance with the teachings of the embodiments described throughout this disclosure, the base station receives user data from the UE. In step 2320 (which may be optional), the base station initiates transmission of the received user data to the host computer. In step 2330 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

In view of the above, then, embodiments herein generally include a communication system including a host computer. The host computer may comprise processing circuitry configured to provide user data. The host computer may also comprise a communication interface configured to forward the user data to a cellular network for transmission to a user equipment (UE). The cellular network may comprise a base station having a radio interface and processing circuitry, the base station's processing circuitry configured to perform any of the steps of any of the embodiments described above for a base station.

In some embodiments, the communication system further includes the base station.

In some embodiments, the communication system further includes the UE, wherein the UE is configured to communicate with the base station.

In some embodiments, the processing circuitry of the host computer is configured to execute a host application, thereby providing the user data. In this case, the UE comprises processing circuitry configured to execute a client application associated with the host application.

Embodiments herein also include a method implemented in a communication system including a host computer, a base station and a user equipment (UE). The method comprises, at the host computer, providing user data. The method may also comprise, at the host computer, initiating a transmission carrying the user data to the UE via a cellular network comprising the base station. The base station performs any of the steps of any of the embodiments described above for a base station.

In some embodiments, the method further comprising, at the base station, transmitting the user data.

In some embodiments, the user data is provided at the host computer by executing a host application. In this case, the method further comprises, at the UE, executing a client application associated with the host application.

Embodiments herein also include a user equipment (UE) configured to communicate with a base station. The UE comprises a radio interface and processing circuitry configured to perform any of the embodiments above described for a UE.

Embodiments herein further include a communication system including a host computer. The host computer comprises processing circuitry configured to provide user data, and a communication interface configured to forward user data to a cellular network for transmission to a user equipment (UE). The UE comprises a radio interface and processing circuitry. The UE's components are configured to perform any of the steps of any of the embodiments described above for a UE.

In some embodiments, the cellular network further includes a base station configured to communicate with the UE.

In some embodiments, the processing circuitry of the host computer is configured to execute a host application, thereby providing the user data. The UE's processing circuitry is configured to execute a client application associated with the host application.

Embodiments also include a method implemented in a communication system including a host computer, a base station and a user equipment (UE). The method comprises, at the host computer, providing user data and initiating a transmission carrying the user data to the UE via a cellular network comprising the base station. The UE performs any of the steps of any of the embodiments described above for a UE.

In some embodiments, the method further comprises, at the UE, receiving the user data from the base station.

Embodiments herein further include a communication system including a host computer. The host computer comprises a communication interface configured to receive user data originating from a transmission from a user equipment (UE) to a base station. The UE comprises a radio interface and processing circuitry. The UE's processing circuitry is configured to perform any of the steps of any of the embodiments described above for a UE.

In some embodiments the communication system further includes the UE.

In some embodiments, the communication system further including the base station. In this case, the base station comprises a radio interface configured to communicate with the UE and a communication interface configured to forward to the host computer the user data carried by a transmission from the UE to the base station.

In some embodiments, the processing circuitry of the host computer is configured to execute a host application. And the UE's processing circuitry is configured to execute a client application associated with the host application, thereby providing the user data.

In some embodiments, the processing circuitry of the host computer is configured to execute a host application, thereby providing request data. And the UE's processing circuitry is configured to execute a client application associated with the host application, thereby providing the user data in response to the request data.

Embodiments herein also include a method implemented in a communication system including a host computer, a base station and a user equipment (UE). The method comprises, at the host computer, receiving user data transmitted to the base station from the UE. The UE performs any of the steps of any of the embodiments described above for the UE.

In some embodiments, the method further comprises, at the UE, providing the user data to the base station.

In some embodiments, the method also comprises, at the UE, executing a client application, thereby providing the user data to be transmitted. The method may further comprise, at the host computer, executing a host application associated with the client application.

In some embodiments, the method further comprises, at the UE, executing a client application, and, at the UE, receiving input data to the client application. The input data is provided at the host computer by executing a host application associated with the client application. The user data to be transmitted is provided by the client application in response to the input data.

Embodiments also include a communication system including a host computer. The host computer comprises a communication interface configured to receive user data originating from a transmission from a user equipment (UE) to a base station. The base station comprises a radio interface and processing circuitry. The base station's processing circuitry is configured to perform any of the steps of any of the embodiments described above for a base station.

In some embodiments, the communication system further includes the base station.

In some embodiments, the communication system further includes the UE. The UE is configured to communicate with the base station.

In some embodiments, the processing circuitry of the host computer is configured to execute a host application. And the UE is configured to execute a client application associated with the host application, thereby providing the user data to be received by the host computer.

Embodiments moreover include a method implemented in a communication system including a host computer, a base station and a user equipment (UE). The method comprises, at the host computer, receiving, from the base station, user data originating from a transmission which the base station has received from the UE. The UE performs any of the steps of any of the embodiments described above for a UE.

In some embodiments, the method further comprises, at the base station, receiving the user data from the UE.

In some embodiments, the method further comprises, at the base station, initiating a transmission of the received user data to the host computer.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

What is claimed is:

1. A method performed by a wireless device configured for use in a wireless communication system, the method comprising:
configuring a number of parallel hybrid automatic repeat request (HARQ) processes as being available for use;
discontinuously monitoring a downlink control channel, including monitoring the downlink control channel during an active time that is based on how many of the configured number of parallel HARQ processes are used;
responsive to a last available one of the configured number of parallel HARQ processes being put into use, starting a HARQ stall timer; and
monitoring the downlink control channel responsive to expiration of the HARQ stall timer.

2. The method of claim 1, wherein the active time includes times while one or more timers are running, and wherein the method further comprises controlling at least one of the one or more timers based on how many of the configured number of parallel HARQ processes are being used.

3. The method of claim 2, wherein the at least one of the one or more timers includes a discontinuous reception (DRX) inactivity timer.

4. The method of claim 2, wherein said controlling comprises stopping, or refraining from starting, the at least one of the one or more timers, responsive to a last available one of the configured number of parallel HARQ processes being put to use.

5. The method of claim 2, wherein said controlling comprises:
while the HARQ stall timer is running, controlling the at least one of the one or more timers to not be running; and
responsive to expiration of the HARQ stall timer, starting or re-starting the at least one of the one or more timers.

6. The method of claim 1, wherein the HARQ stall timer is started with a value that is a function of:
a time elapsed between when a first available one of the configured number of parallel HARQ processes was put into use and when the last available one of the configured number of parallel HARQ process is put into use; and
a round-trip time or round-trip delay in the wireless communication system.

7. The method of claim 1, wherein the active time is based on whether all of the configured number of parallel HARQ processes are used.

8. The method of claim 1, wherein the wireless communication system is a non-terrestrial wireless communication system.

9. A method performed by a network node configured for use in a wireless communication system, the method comprising:
transmitting, to a wireless device, control signaling that configures the wireless device to:
discontinuously monitor a downlink control channel by monitoring the downlink control channel during an active time that is based on how many of a number of configured parallel hybrid automatic repeat request (HARQ) processes are used;
responsive to a last available one of the configured number of parallel HARQ processes being put into use, start a HARQ stall timer; and
monitor the downlink control channel responsive to expiration of the HARQ stall timer.

10. The method of claim 9, wherein the active time includes times while one or more timers at the wireless device are running, wherein the control signaling configures the wireless device to control at least one of the one or more timers based on how many of the configured number of parallel HARQ processes are being used.

11. The method of claim 10, wherein the at least one of the one or more timers includes a discontinuous reception (DRX) inactivity timer.

12. The method of claim 9, wherein the active time is based on whether all of the configured number of parallel HARQ processes are used.

13. A wireless device configured for use in a wireless communication system, the wireless device comprising:
communication circuitry; and
processing circuitry configured to:
configure a number of parallel hybrid automatic repeat request (HARQ) processes as being available for use;
discontinuously monitor a downlink control channel, including monitoring the downlink control channel during an active time that is based on how many of the configured number of parallel HARQ processes are used;
responsive to a last available one of the configured number of parallel HARQ processes being put into use, start a HARQ stall timer; and
monitor the downlink control channel responsive to expiration of the HARQ stall timer.

14. The wireless device of claim 13, wherein the active time includes times while one or more timers are running, and wherein the processing circuitry is configured to control at least one of the one or more timers based on how many of the configured number of parallel HARQ processes are being used.

15. The wireless device of claim 14, wherein the at least one of the one or more timers includes a discontinuous reception (DRX) inactivity timer.

16. The wireless device of claim 14, wherein the processing circuitry is configured to control the at least one of the one or more timers by stopping, or refraining from starting, the at least one of the one or more timers, responsive to a last available one of the configured number of parallel HARQ processes being put to use.

17. The wireless device of claim 14, wherein the processing circuitry is configured to control the at least one of the one or more timers by:
    while the HARQ stall timer is running, controlling the at least one of the one or more timers to not be running; and
    responsive to expiration of the HARQ stall timer, starting or re-starting the at least one of the one or more timers.

18. The wireless device of claim 13, wherein the HARQ stall timer is started with a value that is a function of:
    a time elapsed between when a first available one of the configured number of parallel HARQ processes was put into use and when the last available one of the configured number of parallel HARQ process is put into use; and
    a round-trip time or round-trip delay in the wireless communication system.

19. The wireless device of claim 13, wherein the active time is based on whether all of the configured number of parallel HARQ processes are used.

20. The wireless device of claim 13, wherein the wireless communication system is a non-terrestrial wireless communication system.

21. A network node configured for use in a wireless communication system, the network node comprising:
    communication circuitry; and
    processing circuitry configured to transmit, to a wireless device, control signaling that configures the wireless device to:
        discontinuously monitor a downlink control channel by monitoring the downlink control channel during an active time that is based on how many of a number of configured parallel hybrid automatic repeat request (HARQ) processes are used;
        responsive to a last available one of the configured number of parallel HARQ processes being put into use, start a HARQ stall timer; and
        monitor the downlink control channel responsive to expiration of the HARQ stall timer.

22. The network node of claim 21, wherein the active time includes times while one or more timers at the wireless device are running, wherein the control signaling configures the wireless device to control at least one of the one or more timers based on how many of the configured number of parallel HARQ processes are being used.

23. The network node of claim 22, wherein the at least one of the one or more timers includes a discontinuous reception (DRX) inactivity timer.

24. The network node of claim 21, wherein the active time is based on whether all of the configured number of parallel HARQ processes are used.

* * * * *